United States Patent
Rashid et al.

(10) Patent No.: US 12,554,678 B2
(45) Date of Patent: Feb. 17, 2026

(54) PRESERVING INODE NUMBER INFORMATION IN IN-BAND MIGRATION OF SOURCE FILESYSTEM TO DESTINATION FILESYSTEM

(71) Applicant: Dell Products L.P., Round Rock, TX (US)

(72) Inventors: Ahsan Rashid, Piscataway, NJ (US); Morgan A Clark, South Orange, NJ (US); Walter Forrester, Berkeley Heights, NJ (US)

(73) Assignee: Dell Products L.P., Round Rock, TX (US)

( * ) Notice: Subject to any disclaimer, the term of this patent is extended or adjusted under 35 U.S.C. 154(b) by 224 days.

(21) Appl. No.: 18/240,885

(22) Filed: Aug. 31, 2023

(65) Prior Publication Data

US 2025/0077472 A1    Mar. 6, 2025

(51) Int. Cl.
| | |
|---|---|
| *G06F 16/00* | (2019.01) |
| *G06F 16/10* | (2019.01) |
| *G06F 16/11* | (2019.01) |
| *G06F 16/13* | (2019.01) |
| *G06F 16/182* | (2019.01) |

(52) U.S. Cl.
CPC ............ *G06F 16/119* (2019.01); *G06F 16/10* (2019.01); *G06F 16/13* (2019.01); *G06F 16/183* (2019.01)

(58) Field of Classification Search
CPC ..................................................... G06F 16/10
See application file for complete search history.

(56) References Cited

U.S. PATENT DOCUMENTS

2014/0214909 A1*  7/2014  Resch ................. G06F 16/1727
                                                        707/830

OTHER PUBLICATIONS

Padilla, "Dell EMC Unity: Migration Technologies: A Detailed Review," Jun. 2021.

* cited by examiner

*Primary Examiner* — Ajith Jacob
(74) *Attorney, Agent, or Firm* — Amin, Turocy & Watson, LLP

(57) ABSTRACT

Migration of information, comprising inode numbers, from source filesystem to destination filesystem can be performed and managed. Migrator component can partition inode subspace of destination filesystem into first inode subspace region, comprising first subgroup of inode slices, and second inode subspace region, comprising second subgroup of inode slices. Provisioner manager component can provision first inode slices of the first subgroup in a first order. Inode numbers associated with user files or directories contained in source slices of the source filesystem can be migrated to and allocated for corresponding first inode slices of the destination filesystem. Provisioner manager component can provision second inode slices of the second subgroup in a second order that can be different from the first order. Inodes associated with inode numbers associated with internal files or directories can be stored in the second inode slices. Source filesystem can be active during the migration process.

20 Claims, 11 Drawing Sheets

| INODE SUBSPACE 202 | METADATA SUBSPACE 204 | SHADOW SUBSPACE 206 | DATA SUBSPACE 208 |

PRESERVING INODE NUMBER INFORMATION IN IN-BAND MIGRATION OF SOURCE FILESYSTEM TO DESTINATION FILESYSTEM

BACKGROUND

A filesystem can comprise files, directories, and other information. The files can comprise, for example, user files, system level files, alternate data streams (ADS) containers, and/or other types of files. Some files, such as user files, and directories can be visible to a device (e.g., communication, computing, or client device) or associated user, while other types of files and directories may not be visible to the device or associated user.

The above-described description is merely intended to provide a contextual overview regarding filesystems, and is not intended to be exhaustive.

SUMMARY

The following presents a simplified summary in order to provide a basic understanding of some aspects described herein. This summary is not an extensive overview of the disclosed subject matter. It is intended to neither identify key or critical elements of the disclosure nor delineate the scope thereof. Its sole purpose is to present some concepts in a simplified form as a prelude to the more detailed description that is presented later.

In some embodiments, the disclosed subject matter can comprise a method that can comprise dividing, by a system comprising a processor, a filesystem inode subspace of a filesystem into a first filesystem inode subspace region comprising a first portion of inode slices and a second filesystem inode subspace region comprising a second portion of inode slices. The method also can include provisioning, by the system, first inode slices of the first portion of inode slices in a first order, wherein items of information contained in source slices of a source filesystem can be migrated to the first inode slices of the filesystem. The method further can include provisioning, by the system, second inode slices of the second portion of inode slices in a second order that is different from the first order.

In certain embodiments, the disclosed subject matter can comprise a system that can comprise a memory that can store computer executable components, and a processor that can execute computer executable components stored in the memory. The computer executable components can comprise a partitioner component that can partition a filesystem inode subspace of a destination filesystem into a first filesystem inode subspace region comprising a first group of inode slices and a second filesystem inode subspace region comprising a second group of inode slices. The computer executable components also can comprise a provisioner manager component that can provision first inode slices of the first group of inode slices in a first order, and provisions second inode slices of the second group of inode slices in a second order that can be different from the first order, wherein items of information of source slices of a source filesystem can be migrated to the first inode slices of the destination filesystem.

In still other embodiments, the disclosed subject matter can comprise a non-transitory machine-readable medium, comprising executable instructions that, when executed by a processor, can facilitate performance of operations. The operations can comprise partitioning a group of inode slices of a target filesystem into a first subgroup of inode slices and a second subgroup of inode slices. The operations also can comprise provisioning first inode slices of the first subgroup of inode slices in a first order, wherein inode information of inodes with inode numbers, which can be source slices of a source filesystem, can be migrated to the first inode slices of the target filesystem, wherein the inode numbers can be associated with files or directories being migrated to the target filesystem. The operations further can comprise provisioning second inode slices of the second subgroup of inode slices in a second order that can be distinct from the first order.

The following description and the annexed drawings set forth in detail certain illustrative aspects of the subject disclosure. These aspects are indicative, however, of but a few of the various ways in which the principles of various disclosed aspects can be employed and the disclosure is intended to include all such aspects and their equivalents. Other advantages and features will become apparent from the following detailed description when considered in conjunction with the drawings.

DETAILED DESCRIPTION

Figure 1:
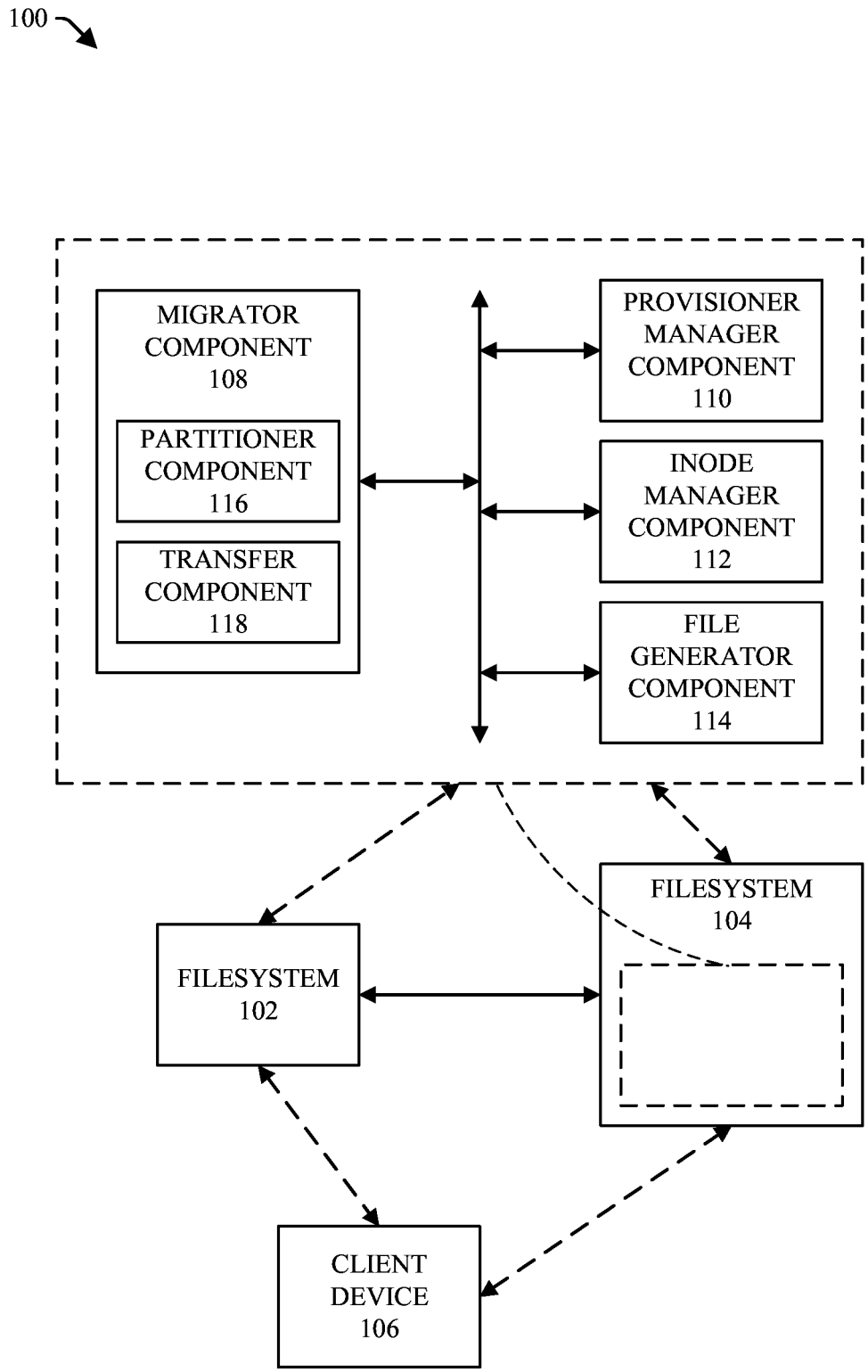
FIG. 1 illustrates a block diagram of a non-limiting example system that can desirably migrate or facilitate migrating (e.g., via in-band migration) information, including files and directories, inode numbers associated with the files and directories, and/or other information relating to the files and directories, from a source filesystem to a destination filesystem, in accordance with various aspects and embodiments of the disclosed subject matter.

Various aspects of the disclosed subject matter are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects.

This disclosure relates generally to preserving index node (inode) information, including inode number information, in in-band migration of a source filesystem to a destination filesystem. In-band migration can involve migrating files and directories from a source filesystem (e.g., an active source filesystem) to a destination filesystem, while preserving common internet filesystem (CIFS) and network filesystem (NFS) open file handles. With regard to a file or directory, an open file handle can comprise an inode number associated with the file or directory, in addition to other information. An inode can be a data structure that can describe a filesystem object, such as a file or a directory stored in the filesystem. The inode can store attributes and storage locations of the filesystem object's data in a data store of the filesystem, wherein the attributes can comprise, for example, metadata, ownership of the filesystem object, access or permission information (e.g., access, read, write, and/or execute permissions), file type, time information (e.g., timestamps or other time information) relating to the file or directory, and/or other information relating to the filesystem object. It can be desirable to preserve this information relating to or comprising open file handles and inodes (e.g., inode numbers) during migration of the file or directory from the source filesystem to the destination filesystem.

In addition to user files and directories, a filesystem may contain internal files and directories that may not be visible to a device (e.g., communication, computing, or client device) or a user associated therewith. Some examples of internal files and directories can include, system level files and directories, such as access control list (ACL) and quota database files and /etc directories, wherein /etc directories can store storage system configuration files, executables desired (e.g., wanted or required) to boot the filesystem and/or associated system or device, certain log files associated with the filesystem, and/or other files or information. Other example internal files and directories can comprise files and directories that can be created as a side effect of creating user files. Such internal files and directories can include alternate data streams (ADS) containers and hard-link databases (HLDBs). These internal files and/or directories can be created on the destination filesystem as desired (e.g., wanted, needed, or as otherwise desired), and their inode numbers do not have to be preserved, unless desired.

Some existing techniques for migrating files and directories from a source filesystem to a destination filesystem may undesirably create internal files and/or directories on the destination filesystem with inode numbers which are in use by user files and/or directories on the source filesystem either at the start of the migration or during the migration of files and directories from the source filesystem to the destination filesystem. It can be desirable (e.g., wanted, needed, or otherwise desired) to avoid or prevent creating internal files and/or directories on the destination filesystem with inode numbers which are in use by user files and/or directories on the source filesystem either at the start of the migration or during the migration of files and directories from the source filesystem to the destination filesystem. The latter specification can be because in-band migration of files and directories from a source filesystem to a destination filesystem can allow normal use of the source filesystem while migration is in progress. Also, it can be desirable for a solution to this problem to be on the destination side (e.g., at the destination filesystem) because source side systems already can be in field and cannot always be upgraded to install updates. Another existing technique can relate to migrating files and directories from a lower-bit (e.g., 32-bit) source filesystem to a larger-bit (e.g., 64-bit) destination filesystem, where the larger-bit inode subspace (e.g., 32 terabyte (TB) subspace) of the destination filesystem can be divided into two equal halves (e.g., two equal 16 TB halves). The first half of the subspace can be reserved for inodes migrated from the source filesystem to the destination filesystem, and the second half of the subspace can be used for internal nodes of the destination filesystem. This is able to work because the lower-bit source filesystem utilize a lower-bit (e.g., 32-bit) inode number, and hence, can support less than 4 billion inodes, and the first half (e.g., 16 TB) of the subspace of the larger-bit (e.g., 64-bit) destination filesystem is large enough to store the migrated inodes. However, this technique for dividing a larger-bit inode subspace of a destination filesystem into two equal halves cannot work for migration of a source filesystem to a destination filesystem when they are both of the same or similar bit size (e.g., 64-bit) and subspace size (e.g., 32 TB) because the space utilized for inodes of the source filesystem can be greater than half of the subspace (e.g., greater than 16 TB) of the destination filesystem.

A possible alternate technique can be to find the highest allocated inode number in the source filesystem and use that to partition the inode subspace of the destination filesystem. However, a problem with this alternate technique can be that the source filesystem can be active during the migration of files and directories from the source filesystem to the destination filesystem, and there can be nothing stopping the source filesystem from allocating a higher number inode if such a higher number inode is desired (e.g., wanted, needed, or otherwise desired).

A possible variation of this alternate technique can be to find the highest allocated inode number in the source filesystem and add a cushion beyond the highest allocated inode number (e.g., add, as a cushion, a certain number of inode numbers that can be higher than the highest allocated inode number), and utilize that (e.g., the highest allocated inode number plus the cushion) to determine where to partition the inode subspace of the destination filesystem. However, this existing variation of the alternate technique can be problematic and can fail, for example, if the source filesystem uses up this cushion space and allocates an inode number that is higher than the (initial) highest allocated inode number plus the cushion space.

The disclosed subject matter can address and overcome these and other deficiencies of existing techniques with regard to migrating files and directories from a source filesystem to a destination filesystem.

To that end, techniques that can desirably (e.g., suitably, reliably, efficiently, enhancedly, and/or optimally) migrate or facilitate migrating information, including files (e.g., user files) and directories, inode numbers associated with the files and directories, and/or other information relating to the files and directories, from a source filesystem to a destination filesystem are presented. Such techniques can be utilized to desirably migrate information (e.g., files and directories, inodes and inode numbers associated with the files and directories, and/or other information relating to the files and directories) from a source filesystem to a destination filesystem, particularly when the source filesystem and the destination filesystem are of the same or similar size (e.g., same or similar bit size and/or same or similar amount of subspace) and/or the source filesystem is active during such migration of information.

With regard to the source filesystem being active during the migration process (e.g., in-band migration), in some embodiments, one or more client devices can be connected to and utilizing the source filesystem while a migrator component, and other associated components, can perform the migration process to migrate (e.g., transfer) the information from the source filesystem to the destination file system. After the migration process is completed, the migrator component can cut over (e.g., seamlessly cut or switch over, without service or operational interruption) or facilitate cutting over operation from the source filesystem to the destination filesystem, wherein the one or more client devices can be connected to, can interact with, and/or can be serviced by the destination filesystem after such cut over to the destination filesystem.

As part of the migration process, the migrator component can partition a filesystem inode subspace of a destination filesystem into a first filesystem inode subspace region, comprising a first subgroup of first inode slices, and a second filesystem inode subspace region, comprising a second subgroup of second inode slices. In some embodiments, the first inode slices of the first subgroup can be lower numbered slices than the second inode slices of the second subgroup (e.g., with regard to inode slices 0 through 131071 of an inode subspace, the first inode slices can comprise inode slice 0, inode slice 1, inode slice 2, and inode slice 3, as well as other relatively lower numbered inode slices; and the second inode slices can comprise inode slice 131068, inode slice 131069, inode slice 131070, and inode slice 131071, as well as other relatively higher numbered inode slices).

During the migration process, the migrator component can migrate (e.g., transfer) open file handles (e.g., CIFS and/or NFS open file handles), comprising inode numbers, that can be associated with files and/or directories (e.g., user files and/or directories) contained in source slices of the source filesystem to the first inode slices of the destination filesystem, in connection with the migrator component migrating other information (e.g., the files and/or directories, and/or other metadata besides the inodes) from the source filesystem to the destination filesystem. The migrator component can thus desirably preserve (e.g., maintain, save, or sustain) the open file handles, including the inode numbers, and/or other information associated with the files and/or directories of the source filesystem on the destination filesystem.

The inode number of an inode typically can be a function of the location of that inode in the inode subspace, where lower inode numbers can correspond to lower filesystem addresses. Accordingly, lower numbered inode slices typically can store inodes with lower numbered inode numbers, and higher numbered inode slices typically can store inodes with higher numbered inode numbers (e.g., an inode number of a lower numbered inode slice (e.g., inode slice 0) can be lower than an inode number of a higher numbered inode slice (e.g., inode slice 100)). The respective inode numbers of respective inodes associated with respective user files and/or respective directories can be mapped (e.g., linked) to the respective user files and/or respective directories, and can be mapped to respective first inode slices of the first subgroup of first inode slices (e.g., by the migrator component, an inode manager component, or other component).

In accordance with various embodiments, the migrator component can comprise and/or employ a provisioner manager component that can provision first inode slices of the first subgroup of first inode slices in a first order to facilitate storage of inodes (e.g., allocated inodes with inode numbers), including inodes migrated from the source filesystem, to the destination filesystem. The first order can be arranged, structured, or determined (e.g., by the migrator component, inode manager component, provisioner manager component, or other component) based at least in part on an order of the migration of user files and/or directories, the inode numbers associated with (e.g., mapped or linked to) the user files and/or directories, and/or the mapping of respective inode numbers of respective inodes to respective first inode slices of the first subgroup of first inode slices. For instance, during the migration process, the provisioner manager component can provision respective first inode slices of the first subgroup (e.g., at respective time instances), if and as desired (e.g., wanted, needed, or otherwise desired), based at least in part on the inode numbers (e.g., allocation of inodes with inode numbers preserved during migration) associated with the user files and/or directories as the user files and/or directories are being migrated from the source filesystem to the destination filesystem.

In some instances, during the migration process, user files and/or directories potentially may not be migrated in an order that results in the inode numbers associated with such user files and/or directories being in order (e.g., numerical order) from lower inode number to higher inode number during migration. In such instances, the provisioner manager component can provision a first inode slice of the first subgroup, if and as desired, based at least in part on the inode number associated with the user file or directory being migrated. For example, if a first migrated user file is associated with a first (e.g., relatively higher) inode number that corresponds to unprovisioned inode slice 10 of the first subgroup of inode slices, the provisioner manager component can provision that inode slice 10, and, if subsequently, a second migrated user file is associated with a second (e.g., relatively lower) inode number that corresponds to unprovisioned inode slice 5 of the first subgroup of inode slices, the provisioner manager component can provision inode slice 5, in accordance with the first order.

In certain other instances, during the migration process, user files and/or directories may be migrated in an order that does result in the inode numbers associated with such user files and/or directories being in order (e.g., numerical order) from lower inode number to higher inode number during migration. In such other instances, the provisioner manager component can provision the first inode slices of the first subgroup, if and as desired, based at least in part on the inode numbers associated with the user files and/or directories being migrated, such that, for example, the provisioner manager component can provision the first inode slices from a lower numbered inode slice of the first filesystem inode subspace region to a relatively higher numbered inode slice of the first filesystem inode subspace region, in accordance with the first order. Post migration completion, the provisioner manager component typically can provision unprovisioned first inode slices (e.g., remaining unprovisioned first inode slices) in order from a lower numbered first inode slice of the first filesystem inode subspace region to a relatively higher numbered first inode slice of the first filesystem inode subspace region, in accordance with the first order, such as described herein.

With further regard to the migration process, during the migration process, the provisioner manager component can provision second inode slices of the second subgroup of inode slices in a second order that can be different from (e.g., distinct, disparate, or distinguishable from) the first order. For instance, the provisioner manager component can provision the second inode slices in order from a highest (e.g., last) or higher numbered inode slice of the second filesystem inode subspace region to a relatively lower numbered inode slice of the second filesystem inode subspace region. In some embodiments, the provisioner manager component can provision a second inode slice of the second subgroup of inode slices if and when desired (e.g., wanted, needed, or as otherwise desired). For example, in response to determining that there is no more available space in a slice of the second subgroup of inodes slices to store inodes (e.g., inodes associated with internal files and/or internal directories of the destination filesystem), the provisioner manager component can provision another slice of the second subgroup of inodes slices for use in storing inodes. In certain embodiments, the migrator component or provisioner manager component can demarcate the first filesystem inode subspace region and the second filesystem inode subspace region by maintaining at least one unprovisioned slice between the first filesystem inode subspace region and the second filesystem inode subspace region.

With further regard to internal files and internal directories, internal files and/or internal directories of the source filesystem typically can be particular to that source filesystem and will not be migrated to the destination filesystem during the migration process. During the migration process, a file generator component, of or associated with the destination filesystem, can generate files and/or directories, including internal files and/or internal directories of the destination filesystem that can be associated with the user files and/or directories being migrated from the source filesystem to the destination filesystem. For instance, the file generator component can generate desired internal files and/or internal directories, such as system level files (e.g., ACL and quota database files), ADS containers, and/or HLDBs, on the destination filesystem, by rebuilding (e.g., reconstructing or reconstituting) or re-applying the parameters, settings, attributes, and/or other features of internal files and/or internal directories on the source filesystem to generate the internal files and/or internal directories on the destination filesystem. In connection with the generating of the internal files and/or internal directories of the destination filesystem, an inode manager component can allocate inodes with inode numbers that can be associated with the internal files and/or internal directories. The migrator component can store those inodes associated with the internal files and/or directories in the provisioned second inode slices of the second filesystem inode subspace region.

In certain embodiments, the techniques of the disclosed subject matter can be utilized to perform chain migration of information, comprising migration of information from a source filesystem to a destination filesystem, and migration of destination filesystem information from the destination filesystem (as a second source filesystem) to a second destination filesystem, and/or one or more other chain migrations of information between filesystems. For instance, at some desired time after the migration of the information from the source filesystem to the destination filesystem is complete, it may be desired to migrate destination filesystem information (e.g., user files and/or directories, inode numbers, other metadata, and/or other information) from the destination filesystem (as the second source filesystem) to the second destination filesystem. The migrator component (or another migrator component associated with the second destination filesystem) can perform and manage migration of the destination filesystem information (e.g., a desired portion of the information stored on the destination filesystem) from the destination filesystem, which, at this point, can be a second source filesystem, to the second destination filesystem, such as described herein.

These and other aspects and embodiments of the disclosed subject matter will now be described with respect to the drawings.

Referring now to the drawings, FIG. 1 illustrates a block diagram of a non-limiting example system 100 that can desirably (e.g., efficiently, reliably, suitably, enhancedly, or optimally) migrate or facilitate migrating (e.g., via in-band migration) information, including files and directories, inode numbers associated with the files and directories, and/or other information relating to the files and directories, from a source filesystem to a destination filesystem, in accordance with various aspects and embodiments of the disclosed subject matter. The system 100 can comprise a filesystem 102 (also referred to herein as a source filesystem) and a filesystem 104 (also referred to herein as a destination filesystem). The filesystem 102 can be part of or implemented by one or more servers. The filesystem 104 also can be part of or implemented by one or more servers (e.g., other servers).

The filesystem 102 can store (e.g., in a data store) user files and/or directories (e.g., directories for user files) that can be generated (e.g., created) by one or more client devices, such as client device 106, that can be associated with (e.g., communicatively connected to) the filesystem 102 at various times. The filesystem 102 can have respective inodes and respective associated inode numbers that can be associated with respective files and/or respective directories. The filesystem 102 also can generate and store internal files and/or internal directories that can be associated with (e.g., can relate to) the files and/or directories. The filesystem 102 can allocate respective inodes and respective associated inode numbers that can be associated with respective internal files and/or respective internal directories.

The bit size, amount of storage space, and/or virtual address space of the filesystem 102 can be the same as or different from the bit size, amount of storage space, and/or virtual address space of the filesystem 104. For example, the filesystem 102 can have a first bit size (e.g., 64-bit or other desired bit size that can be greater or less than 64-bit), and the filesystem 104 can have a second bit size (e.g., 64-bit or other desired bit size that can be greater or less than 64-bit) that can be the same as or different from the first bit size of the filesystem 102.

Figure 2:
FIG. 2 depicts a block diagram of a non-limiting example filesystem virtual address space of a filesystem, in accordance with various aspects and embodiments of the disclosed subject matter.

Referring to FIG. 2 (along with FIG. 1), FIG. 2 depicts a block diagram of a non-limiting example filesystem virtual address space 200 of a filesystem, in accordance with various aspects and embodiments of the disclosed subject matter. The example filesystem virtual address space 200 can be utilized by the filesystem 102 and/or filesystem 104. The example filesystem virtual address space 200 can comprise an inode subspace 202, a metadata subspace 204, a shadow subspace 206, and a data subspace 208 of respective sizes.

The inode subspace 202 can comprise or store respective inodes and associated inode numbers that can be associated with respective files and/or respective directories (e.g., user files and/or directories, and/or internal files and/or internal directories). The inode subspace 202 can have a desired size. In some embodiments, the inode subspace 202 can have a size of 32 terabytes (TB), although, in other embodiments, the inode subspace 202 can have a size that can be greater or less than 32 TB. In certain embodiments, the inode subspace 202 can have a fixed and/or static threshold inode subspace size limit.

The metadata subspace 204 can comprise data blocks for internal files and all directories (e.g., user directories, internal directories) of the filesystem, and indirect blocks for all files (e.g., user files and other types of files) and directories. The metadata subspace 204 can have a desired size. In certain embodiments, the metadata subspace 204 can have a size of 4 petabytes (PB), although, in other embodiments, the metadata subspace 204 can have a size that can be greater or less than 4 PB. In some embodiments, the metadata subspace 204 can have a fixed and/or static threshold metadata subspace size limit.

The shadow subspace 206 can comprise or store metadata for data stored in the data subspace 208. The shadow subspace 206 can have a desired size. In some embodiments, the shadow subspace 206 can have a size of 1 PB, although, in other embodiments, the shadow subspace 206 can have a size that can be greater or less than 1 PB. In certain embodiments, the shadow subspace 206 can have a fixed and/or static threshold shadow subspace size limit.

The data subspace 208 can comprise data blocks (e.g., user data blocks) that can store data (e.g., data of user files or other data). The data subspace 208 can have a desired size. In some embodiments, the data subspace 208 can have a size of 8 PB, although, in other embodiments, the data subspace 208 can have a size that can be greater or less than 8 PB. User files and/or other data can be stored in the data subspace 208. In certain embodiments, the data subspace 208 can have a fixed and/or static threshold data subspace size limit.

The respective sizes of an inode subspace, metadata subspace, shadow subspace, and/or data subspace of the filesystem 102 can be the same as or different from respective sizes of an inode subspace, metadata subspace, shadow subspace, and/or data subspace of the filesystem 104. The respective sizes of the inode subspace, metadata subspace, shadow subspace, and/or data subspace of the filesystem 104 can be sufficiently large enough to accommodate the amount of data or metadata migrated from the filesystem 102 to the filesystem 104.

With further regard to the client device 106 associated with a user or other entity (e.g., client), at desired times, the device 106 (e.g., communication device, node, or node equipment or device) can be associated with (e.g., communicatively connected) a server (e.g., server component, device, or equipment), comprising or associated with the filesystem 102, to facilitate communication of data between the client device 106 and the server and associated filesystem 102, and/or storage of data in a data store of or associated with the server and associated filesystem 102. It is to be appreciated and understood that, while the system 100 depicts one client device (e.g., client device 106), in other embodiments, the system 100 can comprise more than one device, wherein one or more devices, such as the client device 106, can be associated with (e.g., communicatively connected to) the filesystem 102 (e.g., via one or more servers). In certain embodiments, the filesystem 102 and/or associated server(s) can be part of a node network (e.g., a node network of server nodes) where a device (e.g., client device 106) can connect to the node network, which can result in the device being connected to a server of the node network.

The client device 106, can be a computer, a laptop computer, a server, a wireless, mobile, or smart phone, electronic pad or tablet, a virtual assistant (VA) device, electronic eyewear, electronic watch, or other electronic bodywear, an electronic gaming device, an Internet of Things (IoT) device (e.g., health monitoring device, toaster, coffee maker, blinds, music players, speakers, a telemetry device, a smart meter, a machine-to-machine (M2M) device, or other type of IoT device), a device of a connected vehicle (e.g., car, airplane, train, rocket, and/or other at least partially automated vehicle (e.g., drone)), a personal digital assistant (PDA), a dongle (e.g., a universal serial bus (USB) or other type of dongle), a communication device, or other type of device. In some embodiments, the non-limiting term user equipment (UE) can be used to describe the device. The client device 106 can be associated with (e.g., communicatively connected to) filesystem 102 and associated server(s) via a communication connection and channel, which can include a wireless or wireline communication connection and channel.

In certain embodiments, at various times, the client device 106 and/or one or more other devices can be associated with (e.g., communicatively connected to) the filesystem 102 and associated server(s) or the filesystem 104 and associated server(s), via a communication network (not explicitly shown) via respective communication connections and channels, which can include wireless or wireline communication connections and channels. At various times, the filesystem 102 and associated server(s) can be associated with (e.g., communicatively connected to) the filesystem 104 and associated server(s), via the communication network via respective communication connections and channels, which can include wireless or wireline communication connections and channels. The communication network can comprise various network equipment (e.g., routers, gateways, transceivers, switches, base stations, access points, radio access networks (RANs), or other devices) that facilitate (e.g., enable) communication of information between respective items of network equipment of the communication network, communication of information between the one or more devices (e.g., client device 106, server, or other device) and the communication network, and communication of information between the devices and the one or more servers or between each other. The communication network can provide or facilitate wireless or wireline communication connections and channels between the one or more devices (e.g., client device 106, server, or other device), and respectively associated services, and the communication network. For reasons of brevity or clarity, the various network equipment, components, functions, or devices of the communication network are not explicitly shown.

As disclosed, in some instances, it can be desirable to migrate information (e.g., user files and/or directories, inodes, inode numbers, and/or other information) from the source filesystem 102 to the destination filesystem 104. It also can be desirable for such migration of information to be in-band migration such that, during the migration process, the source filesystem 102 can be active and can allow client devices, such as the client device 106, to connect to, interact with, and/or perform operations (e.g., perform input/output (I/O) operations, write to or edit user files, or perform other desired operations) using the source filesystem 102 (e.g., in a normal or standard operational manner).

To that end, in accordance with various embodiments, the system 100 can comprise a migrator component 108 that can desirably (e.g., efficiently, reliably, suitably, enhancedly, or optimally) perform and manage migration of information (e.g., via in-band migration) from the source filesystem 102 to the destination filesystem 104. In some embodiments, the source filesystem 102 can be active during the migration (e.g., in-band migration) of the information to the destination filesystem 104, including migration of the user files and/or directories, the inodes, associated inode numbers, and/or other information from the source filesystem 102 to the destination filesystem 104, such that one or more client devices (e.g., client device 106) can connect to, interact with, or utilize the source filesystem 102 (e.g., in a normal operational manner) during the migration process to migrate the information from the source filesystem 102 to the destination filesystem 104.

In accordance with various embodiments, the migrator component 108 can be part of the destination filesystem 104 and associated with the source filesystem 102, can be a standalone component that can be associated with (e.g., communicatively connected to) the source filesystem 102 and the destination filesystem 104, or a desired combination thereof. The migrator component 108 can comprise or be associated with, and/or the destination filesystem 104 can comprise or be associated with, a provisioner manager component 110, an inode manager component 112, a file generator component 114, and/or another component that can facilitate the performance of the migration of information from the source filesystem 102 to the destination filesystem 104. The provisioner manager component 110, inode manager component 112, and/or file generator component 114 each respectively can be part of the destination filesystem 104 and associated with the source filesystem 102, can be a standalone component that can be associated with (e.g., communicatively connected to) the source filesystem 102 and the destination filesystem 104, or a desired combination thereof.

In some embodiments, the migrator component 108 can initiate the migration process to migrate information from the source filesystem 102 to the destination filesystem 104. For example, in response to a request from a device, a user (e.g., a user, such as an administrator, technician, or other personnel, associated with the device), or another entity, or when otherwise desired, the migrator component 108 can initiate and perform the migration process (e.g., in-band migration process) to migrate the information, comprising user files and/or directories, open file handles, inodes and associated inode numbers, and/or other information, from the source filesystem 102 to the destination filesystem 104.

The migrator component 108, employing a partitioner component 116, can partition (e.g., divide, apportion, or separate) an inode subspace (e.g., inode subspace 202 of FIG. 2) of the destination filesystem 104 into a first inode subspace region, comprising a first subgroup of inode slices, and a second inode subspace region, comprising a second subgroup of inode slices. In some embodiments, the first inode subspace region and the second inode subspace region can be variable in size. In certain embodiments, the size of the second inode subspace region can be maintained at a desirably smaller size, as compared to the first inode subspace region. For instance, the size of the second inode subspace region can be sufficiently large enough to store certain inode information (e.g., internal inodes and associated inode numbers) associated with the migration of information to the destination filesystem 104 (e.g., associated with internal files and/or internal directories generated by the file generator component 114 during or in connection with the migration), without having any significant amount of unused storage space (e.g., after the migration process is complete), and can be relatively smaller than the first inode subspace region.

In some embodiments, the migrator component 108 can demarcate (e.g., delineate or separate) the first inode subspace region and the second inode subspace region by maintaining at least one slice of the inode subspace as unprovisioned, wherein at least the one slice (e.g., boundary slice(s)) can be located between the first subgroup of inode slices and the second subgroup of inode slices. In certain embodiments, the provisioner manager component 110 (e.g., as directed or controlled by the migrator component 108) can desirably (e.g., suitably, enhancedly, or optimally) provision first inode slices of the first subgroup of inode slices in a first order (e.g., inode slice 0, inode slice 1, inode slice 2, inode slice 3 . . . , in the first inode subspace region), and provision second inode slices of the second subgroup of inode slices in a second order (e.g., last inode slice, next to last inode slice, second to last inode slice . . . , in the second inode subspace region) that can be different than (e.g., opposite of, reverse of, or otherwise different than) the first order, such as described herein. For instance, the provisioner manager component 110 can provision the first inode slices of the first inode subspace region in the first order such that the first inode slices can be provisioned from a lower numbered first inode slice to a higher (e.g., next higher) numbered first inode slice, and can provision the second inode slices of the second inode subspace region in the second order such that the second inode slices can be provisioned from a highest (e.g., last) or other desired higher numbered second inode slice to a lower (e.g., next or adjacent lower) numbered second inode slice.

Figure 3:
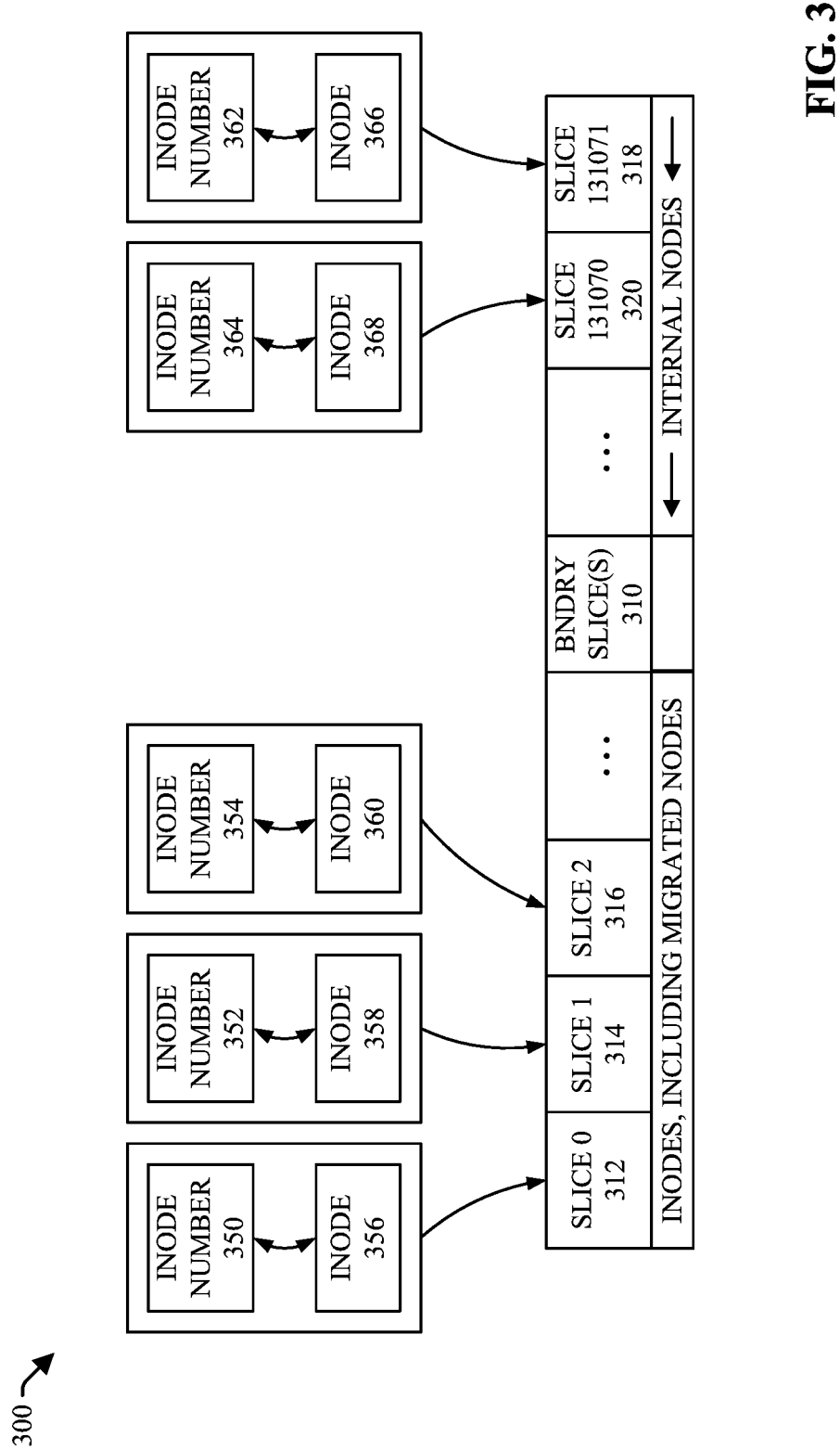
FIG. 3 illustrates a block diagram of an example inode subspace that can be partitioned into respective inode subspace regions, and can have desired (e.g., wanted, preferred, or otherwise desired) respective inode allocation orders, and inode slice provisioning orders, for migrated inode numbers and internal inode numbers in the respective inode subspace regions, in accordance with various aspects and embodiments of the disclosed subject matter.

Referring to FIG. 3 (along with FIGS. 1 and 2), FIG. 3 illustrates a block diagram of an example inode subspace 300 that can be partitioned into respective inode subspace regions, and can have desired (e.g., wanted, preferred, or otherwise desired) respective inode allocation orders, and inode slice provisioning orders, for migrated inode numbers and internal inode numbers in the respective inode subspace regions, in accordance with various aspects and embodiments of the disclosed subject matter. In some embodiments, the inode subspace 300 can be 32 TB in size, although, in other embodiments, the inode subspace 300 can be larger or smaller than 32 TB. The inode subspace 300 can comprise inode slices that, in some embodiments, can be 256 megabytes (MB) in size, although, in other embodiments, the inode slices can be larger or smaller than 256 MB. In certain embodiments, a size of an inode (e.g., an inode structure of an inode) can be 512 bytes, although, in other embodiments, a size of an inode can be larger or smaller than 512 bytes. Typically, an inode slice can store a significant number of inodes and associated inode numbers, given the relative sizes of an inode slice and an inode. If the inode subspace is 32 TB, and the inode slices are each 256 MB, the inode subspace 300 can comprise 131,072 slices, which can be numbered from inode slice 0 to inode slice 131071.

The partitioner component 116 can partition the inode subspace 300 into a first inode subspace region 302 and a second inode subspace region 304, which typically can be smaller (e.g., can comprise fewer inode slices) than the first inode subspace region 302, as described herein. The first inode subspace region 302 can comprise a first subgroup of inode slices 306, and the second inode subspace region 304 can comprise a second subgroup of inode slices 308. The migrator component 108 can demarcate the first inode subspace region 302 and the second inode subspace region 304 by maintaining at least one slice 310 (BNDRY SLICE (S)) of the inode subspace 300 as an unprovisioned slice that can be a variable boundary located between the first inode subspace region 302 (e.g., the first subgroup of inode slices 306 of region 302) and the second inode subspace region 304 (e.g., the second subgroup of inode slices 308 of region 304). The first subgroup of inode slices 306 can comprise inode slice 0 (312), inode slice 1 (314), inode slice 2 (316), and other inode slices (e.g., other inode slices that can be higher numbered than 2) up to the at least one slice 310 that represents the boundary. The second subgroup of inode slices 308 can comprise inode slice 131071 (318) (e.g., the last inode slice of the inode subspace 300), inode slice 131070 (320) (e.g., the next to last inode slice of the inode subspace 300) and other inode slices (e.g., other inode slices that can be lower numbered than 131070) down to the at least one slice 310 that represents the boundary.

The first subgroup of inode slices 306 can be utilized to store inodes with inode numbers that can be associated with files and/or directories (e.g., user files and/or directories) that can be migrated from slices (e.g., inode slices) of the source filesystem 102 to the first subgroup of inode slices 306 of the destination filesystem 104. The inode number of an inode typically can be a function of the location of that inode in the inode subspace, where lower inode numbers can correspond to lower filesystem addresses. Accordingly, lower numbered inode slices typically can store inodes with lower numbered inode numbers, and higher numbered inode slices typically can store inodes with higher numbered inode numbers (e.g., an inode number of a lower numbered inode slice (e.g., inode slice 0) can be lower than an inode number of a higher numbered inode slice (e.g., inode slice 100)). The respective inode numbers of respective inodes associated with respective user files and/or respective directories can be mapped (e.g., linked) to the respective user files and/or respective directories, and can be mapped to respective inode slices of the first subgroup of inode slices 306 (e.g., by the migrator component 108, inode manager component 112, or other component). As a user file or directory is being migrated from the source filesystem 102 to the destination filesystem 104, the inode manager component 112 can determine the desired inode slice of the first subgroup of inode slices 306, based at least in part on the mapping, and can allocate the inode with the corresponding inode number (e.g., associated with that user file or directory) for storage in that inode slice on the destination filesystem 104. When a filesystem (e.g., source filesystem 102, or destination filesystem 104) is not in a migration process (or is a non-migration filesystem), the filesystem (e.g., inode manager component 112 of the filesystem 104) typically can allocate inodes from a lower inode number to a higher inode number (e.g., at least with regard to the first inode subspace region 302 of the destination filesystem 104, after the migration process has been completed). In some embodiments, the inode numbers that can be allocated or assigned can range from 2 to a number (e.g., a positive number) that can be in the billions (e.g., approximately 64 billion, or greater or less than 64 billion), with inode numbers 0 and 1 being reserved, although, in other embodiments, the inode numbers that can be allocated or assigned can range from 0 or 1 to a desired number. The number of inode numbers can be based at least in part on (e.g., a function of) the size of each inode and the size of the inode subspace.

The provisioner manager component 110 (e.g., as directed or controlled by the migrator component 108) can desirably provision first inode slices of the first subgroup of inode slices 306 (e.g., inode slice 0 (312), inode slice 1 (314), inode slice 2 (316), and/or inode slice 3 . . . , in the first inode subspace region 302) in a first order. The provisioner manager component 110 typically can provision each of the first inode slices as and when desired (e.g., wanted or needed), in accordance with the first order. The first order can be arranged, structured, or determined (e.g., by the migrator component 108, provisioner manager component 110, inode manager component 112, or other component) based at least in part on an order of the migration of user files and/or directories, the inode numbers associated with (e.g., mapped or linked to) the user files and/or directories, and/or the mapping of respective inode numbers of respective inodes to respective first inode slices of the first subgroup of inode slices 306.

The inode manager component 112 typically can allocate inode numbers (e.g., inode number (350), inode number (352), and inode number (354)) and associated inodes (e.g., inode 356, inode 358, and inode 360), associated with user files and/or directories, and store or facilitate storing such inodes with inode numbers (e.g., migrated and preserved inodes with migrated and preserved inode numbers) in associated (e.g., corresponding) first inode slices (e.g., provisioned first inode slices) of the first inode subspace region 302. The first order of provisioning first inode slices of the first inode subspace region 302 can correspond to the allocation of inode numbers and associated inodes that can be associated with the user files and/or directories being migrated. As described herein, during the migration process, the migrator component 108 can migrate or facilitate migrating these inode numbers and associated inodes from the source filesystem 102 to the destination filesystem 104 and preserve them on the destination filesystem 104, wherein the same inode numbers can be allocated by the inode manager component 112 of or associated with the destination filesystem 104 to facilitate desirable (e.g., suitable, enhanced, or optimal) migration (e.g., in-band migration) of information (e.g., user files and/or directories, inode numbers, inodes, and/or other desired information) to the destination filesystem 104 from the source filesystem 102.

For example, as disclosed herein, if, on the source filesystem 102, a particular user file is associated with inode number 1000 (e.g., inode number (350)), it can be desired (e.g., wanted, needed, or otherwise desired) to allocate inode number 1000, and the associated inode (e.g., inode 356), for that particular user file when that particular user file is migrated from the source filesystem 102. The migrator component 108 desirably (e.g., suitably, enhancedly, or optimally) can migrate and preserve inode number 1000 during the migration. The inode manager component 112 can determine the inode number (e.g., inode number 1000) associated with the particular user file, based at least in part on the mapping of inode numbers to user files, and can allocate inode number 1000 to the particular user file on the destination filesystem 104. The inode manager component 112 also can determine or identify the inode slice (e.g., inode slice 0 (312), if that inode slice is where inode number 1000 is located) in the first subgroup of inode slices 306 in the first inode subspace region 302 where the inode number 1000 and associated inode is to be stored based at least in part on the mapping of inode numbers to inode slices. The inode manager component 112 also can copy or recreate (e.g., rebuild or reconstruct) the inode information (e.g., attributes and other metadata) of the inode associated with inode number 1000 from the source filesystem 102. The inode manager component 112 can store inode number 1000 and/or the associated inode (e.g., inode information of the inode) in the inode slice associated with inode number 1000 in the first subgroup of inode slices 306 in the first inode subspace region 302. Such operations can be performed with regard to each user file and/or directory, and associated inode number and inode, that is being migrated from the source filesystem 102 to the destination filesystem 104.

It is noted that, in some instances, during the migration process, user files and/or directories potentially may not be migrated in an order that results in the inode numbers associated with such user files and/or directories being in order (e.g., numerical order) from lower inode number to higher inode number during migration. In such instances, the provisioner manager component 110 can provision the respective first inode slices of the first subgroup of inode slices 306, if and as desired (e.g., wanted, need, or otherwise desired), based at least in part on (e.g., in accordance with) the respective inode numbers associated with the respective user files or directories, as the information (e.g., user files, directories, inode numbers, or other information) is being migrated. For example, if a first migrated user file is associated with a first (e.g., relatively higher) inode number that corresponds to unprovisioned inode slice 10 of the first subgroup of inode slices 306, the provisioner manager component 110 can provision that inode slice 10, and, if subsequently, a second migrated user file is associated with a second (e.g., relatively lower) inode number that corresponds to unprovisioned inode slice 5 of the first subgroup of inode slices 306, the provisioner manager component 110 can provision inode slice 5, in accordance with the first order.

In certain other instances, during the migration process, user files and/or directories may be migrated in an order that can result in the inode numbers associated with such user files and/or directories being in order (e.g., numerical order) from lower inode number to higher inode number during migration. In such other instances, the provisioner manager component 110 can provision the first inode slices of the first subgroup of inode slices 306, if and as desired (e.g., wanted, need, or otherwise desired), based at least in part on (e.g., in accordance with) the respective inode numbers associated with the respective user files and/or respective directories as the information (e.g., user files, directories, inode numbers, or other information) is being migrated, such that, for example, the provisioner manager component 110 can provision the first inode slices from a lower numbered inode slice of the first filesystem inode subspace region 302 to a relatively higher numbered inode slice of the first filesystem inode subspace region 302, in accordance with the first order. In this example, the provisioner manager component 110 can provision inode slice 0 (312), followed by inode slice 1 (314), followed by inode slice 2 (316), and so on, in the first inode subspace region 302.

The second subgroup of inode slices 308 can be utilized to store inode numbers (e.g., inode number (362), inode number (364)) and associated inodes (e.g., inode 366, inode 368) relating to internal files and/or internal directories associated with the user files and/or directories. In that regard, it is noted that, internal files and/or internal directories of the source filesystem 102 (e.g., which can relate to the user files and/or directories) typically can be particular (e.g., unique) to that source filesystem 102 and may not be migrated to the destination filesystem 104 during the migration process. As part of the migration process, the file generator component 114, of or associated with the destination filesystem 104, can generate the internal files and/or internal directories associated with the user files and/or directories. For example, in connection with the migrating of the user files and/or directories from the source filesystem 102 to the destination filesystem 104, the file generator component 114 can generate desired internal files and/or internal directories (e.g., associated with the user files and/or directories), such as system level files (e.g., ACL and quota database files), ADS containers, HLDBs, and/or other desired types of internal files and/or internal directories, on the destination filesystem 104, by rebuilding (e.g., reconstructing or reconstituting) or re-applying the parameters, settings, attributes (e.g., characteristics or properties), and/or other features of internal files and/or internal directories on the source filesystem 102, based at least in part on the results of analyzing the internal files and/or internal directories on the source filesystem 102, to generate the internal files and/or internal directories associated with the user files and/or directories (e.g., the migrated user files and/or directories) on the destination filesystem 104. The migrator component 108 or file generator component 114 can store those generated internal files and/or internal directories in storage locations (e.g., data blocks) of the metadata subspace 204.

The provisioner manager component 110 can provision each of the second inode slices, as and when desired (e.g., wanted or needed), in accordance with the second order. In certain embodiments, during the migration process, the provisioner manager component 110 can begin the provisioning of second inode slices of the second inode subspace region 304 by provisioning the highest numbered (e.g., last) inode slice, which can be inode slice 131071 (318). Inodes (e.g., inode 366) with inode numbers (e.g., inode number (362)), associated with the internal files and/or internal directories, can be stored in inode slice 131071 (318), wherein the inode numbers (e.g., inode number (362)) can correspond to (e.g., can be mapped or otherwise associated with) that inode slice (e.g., inode slice 131071 (318)). After the inode slice 131071 (318) is determined (e.g., by the migrator component 108, inode manager component 112, or other component) to be full and there is no more storage space available to store another inode in that inode slice, the provisioner manager component 110 (e.g., as directed or controlled by the migrator component 108) can provision the next lower numbered inode slice, such as inode slice 131070 (320) (e.g., which can be followed by provisioning another lowered numbered inode slice, such as inode slice 131069, if and when desired), in accordance with the second order, so that one or more other allocated inode numbers (e.g., inode number (364)) and associated inodes (e.g., inode 368) associated with the internal files and/or internal directories can be stored in the newly or most recently provisioned inode slice. It is to be appreciated and understood that, in other embodiments, if and as desired, during the migration process, the provisioner manager component 110 can begin the provisioning of second inode slices of the second inode subspace region 304 by first provisioning another higher numbered inode slice (e.g., inode slice 131070 (320)), instead the highest numbered (e.g., last) inode slice (e.g., inode slice 131071 (318)), and can proceed to provision lowered numbered inode slices, such as inode slice 131069, from there, if and when desired, in accordance with the second order, wherein, for example, the highest numbered (e.g., last) inode slice (e.g., inode slice 131071 (318)) can be reserved or bypassed (e.g., for other use or no use).

During the migration process, the migrator component 108, employing a transfer component 118, can migrate or transfer information, comprising user files and/or directories, open file handles (e.g., CIFS and/or NFS open file handles), which can include inode numbers, associated with user files and/or directories, contained in source slices (e.g., data slices, inode slices, metadata slices, or other slices) of the source filesystem 102, from the source filesystem 102 to the destination filesystem 104. As disclosed, the migrator component 108 can desirably (e.g., suitably, enhancedly, or optimally) preserve (e.g., maintain) the open file handles, inode numbers and associated inodes, and/or other desired information associated with the user files and/or directories of the source filesystem 102 during the migration process, so that such open file handles, inode numbers and associated inodes, and/or other desired information can be available and/or usable on the destination filesystem 104. The migrator component 108 can store or facilitate storing the user files in storage locations of the data subspace 208 and the directories in the metadata subspace 204.

In connection with the migrating of the user files and/or directories from the source filesystem 102 to the destination filesystem 104, the migrator component 108 and/or inode manager component 112 can determine respective inode numbers and associated respective inodes that can be associated with the respective user files and/or directories based at least in part on the mapping of the respective inode numbers to the respective user files and/or respective directories. The inode manager component 112 can allocate the respective inodes with the respective inode numbers associated with the respective user files and/or directories. For each of the respective inode numbers, the migrator component 108 provisioner manager component, or inode manager component 112 can determine which first inode slice of the first subgroup of inode slices 306 is associated with the inode number based at least in part on the mapping of respective inode numbers of respective inodes to respective first inode slices of the first subgroup of inode slices 306. The migrator component 108 or inode manager component 112 can store the respective allocated inodes with the respective inode numbers associated with the respective user files and/or directories in the respective first inode slices of the first subgroup of inode slices 306. If an inode number and associated inode is determined (e.g., by the migrator component 108, inode manager component 112, or other component) to be associated with a particular first inode slice of the first subgroup of inode slices 306 that has not yet been provisioned, the provisioner manager component 110 can provision the particular unprovisioned first inode slice associated with the inode number and associated inode to be stored therein, in accordance with the first order.

In that regard, it is noted that, in some instances, prior to or during the migration process (e.g., in-band migration process), on the source filesystem 102, one or more inodes may be deleted, and/or one or more inode slices of the source filesystem 102 may be evacuated or de-provisioned due to being empty (e.g., as a result of inodes of that inode slice being deleted or otherwise removed because an associated user file and/or directory was deleted or otherwise removed from the source filesystem 102). As a result, at the completion of the migration process, there potentially can be instances where there can be one or more available storage locations in an inode slice (e.g., a provisioned inode slice) of the first subgroup of inode slices 306, and/or there potentially can be a first inode slice(s) that remains unprovisioned during the migration process, even though such first inode slice(s) is situated (e.g., located) between respective provisioned first inode slices of the first subgroup of inode slices 306 (e.g., because there are no inode numbers and associated inodes to allocate with such first inode slice(s) as part of the migration process).

After the migration process is completed, the inode manager component 112 can allocate any of those unused inode numbers and associated inodes in available storage locations of such a first inode slice with available storage locations, and/or the provisioner manager component 110 can provision any unprovisioned first inode slice (e.g., between respective provisioned first inode slices) to facilitate storage of inodes with inode numbers associated with such first inode slice, in connection with user files, internal files, directories, and/or internal directories created on the destination filesystem 104 (e.g., by a client device, such as client device 106, subsequent to completion of the migration process), in accordance with the first order.

With further regard to the migration process, if the migrator component 108 determines that there is no more information (e.g., user file and/or directory, inode or associated inode number, and/or other information) remaining to be migrated from the source filesystem 102 to the destination filesystem 104, the migrator component 108 can determine that the migration of information to the destination filesystem 104 is complete. In some embodiments, at this point, the migrator component 108 can cut over (e.g., seamlessly transition or switch over, without interruption of service) or facilitate cutting over from the source filesystem 102 to the destination filesystem 104 to allow (e.g., enable) one or more client devices (e.g., client device 106) to utilize the destination filesystem 104 (e.g., instead of the source filesystem 102).

Subsequent to the completion of the migration process and the cutting over to the destination filesystem 104, the filesystem 104 can operate to manage files and/or other information of or associated with client devices, such as the client device 106. For instance, the client device 106 can access user files and/or directories, including migrated user files and/or directories, stored in the filesystem 104 to which the client device 106 or associated user is authorized to access, create (e.g., generate) or edit (e.g., update or modify) user files via the filesystem 104 and store such user files in the filesystem 104 (e.g., in the data subspace 208 of the filesystem 104), and/or perform other desired operations that the client device 106 or associated user is authorized to perform with respect to the filesystem 104. The filesystem 104, employing the file generator component 114, can generate internal files and/or internal directories associated with user files and/or directories created by the one or more client devices (e.g., client device 106), as desired (e.g., wanted or needed). The file generator component 114 (or other component of the filesystem 104) can store those internal files and/or internal directories in the filesystem 104 (e.g., in the metadata subspace 204 of the filesystem 104).

Subsequent to the completion of the migration process, in connection with the user files and/or directories created by the one or more client devices (e.g., client device 106) and/or the internal files and/or internal directories generated by the file generator component 114, the inode manager component 112 can allocate respective inode numbers (e.g., available inode numbers) and associated inodes for the respective user files and/or respective directories, and/or the respective internal files and/or respective internal directories, in accordance with the first order. In some embodiments, the inode manager component 112 can search (e.g., scan or otherwise search) the first inode slices in the first inode subspace region 302 of the filesystem 104 for an available inode number to associate with a file (e.g., user file or internal file) or directory (e.g., user directory or internal directory). As part of the search, the inode manager component 112 typically can begin with searching provisioned inode slice 0 (312) and, as desired (e.g., wanted or needed), can continue searching one or more other provisioned inode slices in the first inode subspace region 302 up to a last (e.g., highest numbered) provisioned inode slice in the first inode subspace region 302, if desired (e.g., wanted or necessary), in accordance with the first order, until an available inode number is identified.

In some instances, the available inode number may be located in a provisioned inode slice that is not the last (e.g., highest numbered) provisioned slice of the first inode subspace region 302, for example, due to a previous deletion of that inode before or after the migration was performed. In other instances, the available inode number can be located in the last provisioned inode slice of the first inode subspace region 302. In still other instances, there may be no available inode number in a provisioned inode slice. In such other instances, the provisioner manager component 110 can provision another inode slice in the first inode subspace region 302, in accordance with the first order, and the inode manager component 112 can allocate an inode number and associated inode from the newly provisioned inode slice. The newly provisioned inode slice may be a next higher numbered inode slice, which can be after the last provisioned inode slice, in the first inode subspace region 302, in accordance with the first order. In some instances though, there may be a lower numbered unprovisioned inode slice before the last provisioned inode slice, for example, due to a de-provisioning or evacuation of an empty provisioned slice before or after the migration. If, based at least in part on a search (e.g., scan) of the first inode subspace region 302 (e.g., from lowest towards highest numbered inode slices, in accordance with the first order), the provisioner manager component 110 determines that there is such a lower numbered unprovisioned inode slice before the last provisioned inode slice, the provisioner manager component 110 can provision that lower numbered unprovisioned inode slice.

In some embodiments, subsequent to migration completion, when searching the inode subspace 300 (e.g., the first inode subspace region 302 of the inode subspace) for an inode number and associated inode, the filesystem 104 (e.g., the inode manager component 112 or other component of the filesystem 104) typically can search (e.g., in accordance with the first order) only provisioned inode slices in the first inode subspace region 302, and can identify and bypass searching of unprovisioned inode slices in the first inode subspace region 302, which desirably can preserve or save filesystem resources and time. During a search, the filesystem 104 (e.g., the inode manager component 112 or other component of the filesystem 104) also can determine or identify when the at least one boundary slice 310 has been reached, and, if and when the at least one boundary slice 310 has been reached, can terminate the search. For example, if the inode manager component 112 is searching for an available inode number and associated inode in provisioned inode slices in the first inode subspace region 302 and it reaches the at least one boundary slice 310 without locating an available inode number and associated inode, the inode manager component 112 can identify that the at least one boundary slice 310 has been reached, and can terminate the search (e.g., without proceeding to search the second inode subspace region 304). In such instance, the filesystem 104 (e.g., the inode manager component 112 or other component of the filesystem 104) can request that the provisioner manager component 110 provision another inode slice in the first inode subspace region 302.

In some embodiments, to facilitate identifying the at least one boundary slice 310 in the inode subspace 300, during mounting of the filesystem 104 on a server or server network or at another desired time, the filesystem 104 (e.g., inode manager component 112, provisioner manager component 110, or other component of the filesystem 104) can search or scan the inode subspace 300 from the last inode slice to or towards lower numbered inode slices, in accordance with the second order (e.g., right to left, reverse order, or from highest numbered inode slice towards lower numbered inode slices), and, when it reaches an unprovisioned inode slice in the inode subspace 300, the filesystem 104 can identify the unprovisioned inode slice as the at least one boundary slice 310. The filesystem 104 can store boundary information that can identify the location of the at least one boundary slice 310 in memory of the filesystem 104. When the filesystem 104 (e.g., inode manager component 112, provisioner manager component 110, or other component of the filesystem 104) is performing a search of the inode subspace 300 (e.g., the first inode subspace region 302), the filesystem 104 can know where the at least one boundary slice 310 is located in the inode subspace 300 based at least in part on the boundary information stored in the memory. In certain embodiments, during the mounting of the filesystem 104 on a server or server network or at another desired time, the filesystem 104 (e.g., inode manager component 112, provisioner manager component 110, or other component of the filesystem 104) can determine that the filesystem 104 is a destination filesystem that comprises information migrated from a source filesystem (e.g., source filesystem 102) and has an inode subspace 300 that is partitioned into the first inode subspace region 302 and the second inode subspace region 304, based at least in part on a flag or indicator stored in memory of the filesystem 104, wherein the flag or indicator can indicate that the filesystem 104 is a destination filesystem.

It is noted that, in some embodiments, after the migration process is completed, the second inode subspace region 304 can remain static (e.g., unchanged) or at least substantially static with regard to information (e.g., inode numbers and associated inodes associated with internal files and/or internal directories generated by the file generator component 114) during the migration process) stored in the second subgroup of inode slices 308 in the second inode subspace region 304. This can facilitate desirable (e.g., suitable, enhanced, or optimal) chain migration of information, for example, if, after migrating information from the source filesystem 102 to the destination filesystem 104, it is, at some point in time, desired to migrate information stored in the destination filesystem 104 (e.g., information stored in the first inode subspace region 302 of the destination filesystem 104), as a second source filesystem, to a second destination filesystem, such as described herein.

Figure 4:
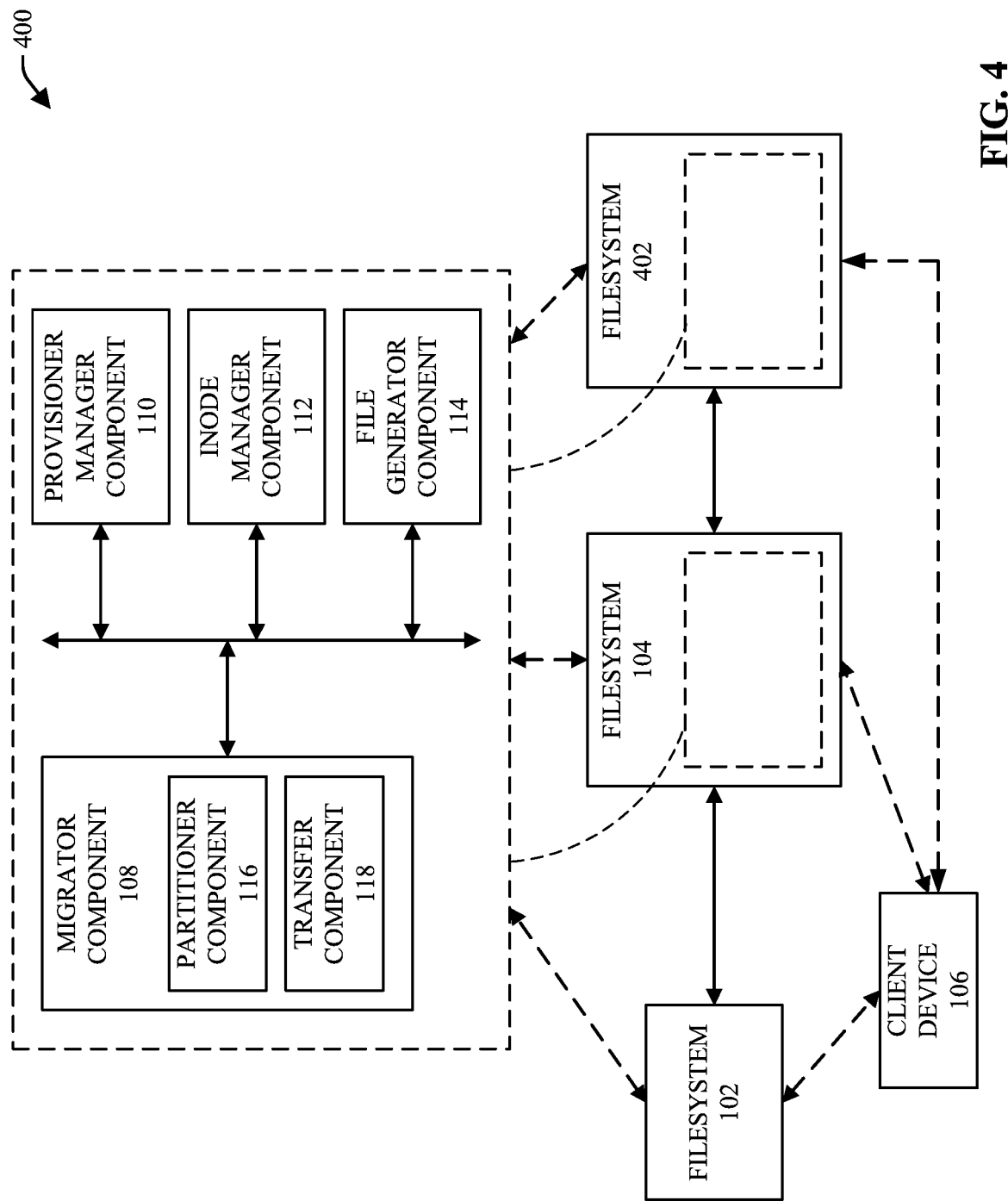
FIG. 4 depicts a block diagram of a non-limiting example system that can desirably perform chain migration to migrate or facilitate migrating (e.g., via in-band migration) first information from a first source filesystem to a first destination filesystem, and to migrate or facilitate migrating second information from the first destination filesystem, which can become a second source filesystem, to a second destination filesystem, in accordance with various aspects and embodiments of the disclosed subject matter.

Turning to FIG. 4, FIG. 4 depicts a block diagram of a non-limiting example system 400 that can desirably (e.g., efficiently, reliably, suitably, enhancedly, or optimally) perform chain migration to migrate or facilitate migrating (e.g., via in-band migration) first information from a first source filesystem to a first destination filesystem, and to migrate or facilitate migrating second information from the first destination filesystem, which can become a second source filesystem, to a second destination filesystem, in accordance with various aspects and embodiments of the disclosed subject matter. The system 400 can comprise the source filesystem 102, the destination filesystem 104, and a second destination filesystem 402. The system 400 also can comprise one or more client devices, such as the client device 106, migrator component 108, provisioner manager component 110, inode manager component 112, and file generator component 114.

At various times before and/or during a first migration (e.g., in-band migration) process to migrate first information from the source filesystem 102 to the destination filesystem 104, one or more client devices, such as the client device 106, can be associated with the source filesystem 102 to create, edit, or interact with one or more user files and/or directories stored on the source filesystem 102. The migrator component 108 (e.g., in conjunction with the provisioner manager component 110, inode manager component 112, and/or file generator component 114) can perform the first migration process to migrate the first information (e.g., first user files, first user directories, first open file handles, first inodes, first inode numbers, and/or other first information) from the source filesystem 102 to the destination filesystem 104, such as described herein.

The migrator component 108 can partition the inode subspace of the destination filesystem 104 into the first inode subspace region and the second inode subspace region, such as described herein. The provisioner manager component 110 can provision the first inode slices of the first inode subspace region, in accordance with the first order, and can provision the second inode slices of the second inode subspace region, in accordance with the second order, such as described herein. The migrator component 108 can migrate or transfer the first information from the source filesystem 102 to the destination filesystem 104, such as described herein. With regard to the inode subspace of the destination filesystem 104, the inodes and associated inode numbers associated with the user files and/or directories that are being migrated can be stored in the provisioned first inode slices of the first inode subspace region, in accordance with the first order, and inodes and associated inodes numbers associated with internal files and/or internal directories generated by the file generator component 114 can be stored in the provisioned second inode slices of the second inode subspace region, in accordance with the second order, such as described herein.

As desired, after the first migration process is complete, one or more client devices, such as the client device 106, can utilize or interact with the destination filesystem 104 to create or edit user files and/or directories, wherein inodes and associated inode numbers (e.g., available inode numbers and associated inodes) can be allocated to and associated with (e.g., by the inode manager component 112) user files and/or directories, and can be stored in the first inode subspace region of the destination filesystem 104, such as described herein. Also, if and as desired, after the first migration process is complete, the file generator component 114 can generate internal files and/or internal directories (e.g., internal files and/or internal directories that can be associated with user files and/or directories). The inode manager component 112 can search for (e.g., in the first inode subspace region of the destination filesystem 104), identify, and allocate available inode numbers and associated (e.g., corresponding) inodes that can be associated with those internal files and/or internal directories, and can store such inode numbers and/or associated inodes (e.g., respective inodes comprising respective inode information) in the corresponding inode slices (e.g., inode slices corresponding to the inode numbers) in the first inode subspace region of the destination filesystem 104, such as described herein. The internal files and/or internal directories can be stored in the metadata subspace or other desired storage of the destination filesystem 104.

In certain embodiments, subsequent to completion of the migration to the destination filesystem 104, the second inode subspace region (e.g., 304) of the inode subspace (e.g., 300) of the destination filesystem 104 can be managed such that the second inode subspace region may no longer be used for storage of any additional inode numbers and inodes. Rather, the first inode subspace region (e.g., 302) can be utilized to store inodes and inode numbers associated with user files and/or directories, and/or internal files and/or internal directories, such as described herein. This can facilitate chain migration of information, if desired, since only the first inode subspace region (e.g., 302) of the inode subspace of the destination filesystem 104 can contain any information (e.g., user files and/or directories, and inode numbers and inodes associated therewith) that may be migrated to another destination filesystem (e.g., second destination filesystem 402). The inodes and associated inode numbers in the second inode subspace region can be associated with internal files and/or internal directories that can be unique to the destination filesystem 104, and, accordingly, such information relating to those internal files and/or internal directories, including those inodes and associated inode numbers, typically does not have to be migrated to another destination filesystem. To facilitate identifying where the second inode subspace region (e.g., 304) is located within the inode subspace (e.g., 300) of the destination filesystem 104, region or boundary identifier information, which can identify the location of the unprovisioned (e.g., demarcation or boundary) slice and/or the location (e.g., the starting or first inode slice and/or the ending or last inode slice) of the second inode subspace region within the inode subspace of the destination filesystem 104, can be stored in memory of the destination filesystem 104.

As disclosed, in some embodiments, the techniques relating to migration of information between filesystems can be utilized to perform chain migration of information. For instance, subsequent to the completion of the first migration process and/or the one or more client devices (e.g., the client device 106) creating and/or editing user files and/or directories on the destination filesystem 104, if and as desired, a migrator component 108 (e.g., in conjunction with provisioner manager component 110, inode manager component 112, and/or file generator component 114) can perform a second migration process to migrate second information (e.g., second user files, second user directories, second open file handles, second inodes, second inode numbers, and/or other second information) from the destination filesystem 104, as a second source filesystem, to a second destination filesystem 402, such as described herein. In accordance with various embodiments, the migrator component, provisioner manager component, inode manager component, and/or file generator component used during the second migration process can be the same components that were used during the first migration process, or can be a different or separate migrator component, provisioner manager component, inode manager component, and/or file generator component that can have the same or similar functionality as the migrator component 108, provisioner manager component 110, inode manager component 112, and/or file generator component 114 utilized during the first migration process. The second migration process can be performed by the respective components utilizing the same or similar techniques that were utilized to perform the first migration process.

The migrator component (e.g., migrator component 108) of or associated with the second destination filesystem 402 can partition the inode subspace of the second destination filesystem 402 into a first inode subspace region and a second inode subspace region, utilizing the techniques described herein. The provisioner manager component (e.g., provisioner manager component 110) can provision first inode slices of the first inode subspace region, in accordance with the first order, and can provision second inode slices of the second inode subspace region, in accordance with the second order, utilizing the techniques described herein. The migrator component can migrate or transfer the second information from the filesystem 104 (e.g., which can be a second source filesystem, and which was the first destination filesystem, in this migration chain) to the second destination filesystem 402, utilizing the techniques described herein. With regard to the inode subspace of the second destination filesystem 402, the inodes and associated inode numbers associated with the user files and/or directories that are being migrated can be stored in provisioned first inode slices of the first inode subspace region of the second destination filesystem 402, in accordance with the first order, and inodes and associated inodes associated with internal files and/or internal directories generated by the files generator component (e.g., file generator component 114) can be stored in provisioned second inode slices of the second inode subspace region of the second destination filesystem 402, in accordance with the second order, utilizing the techniques described herein.

If and as desired, one or more other migration processes can be performed, utilizing the techniques described herein, to migrate information from the second destination filesystem 402 (as a third source filesystem) to a third destination filesystem, and/or to migrate information from the third destination filesystem (as a fourth source filesystem) to a fourth destination filesystem, and/or to perform one or more other migration processes to migrate information from a source filesystem (which also can be a previous destination filesystem) to a destination filesystem.

Figure 5:
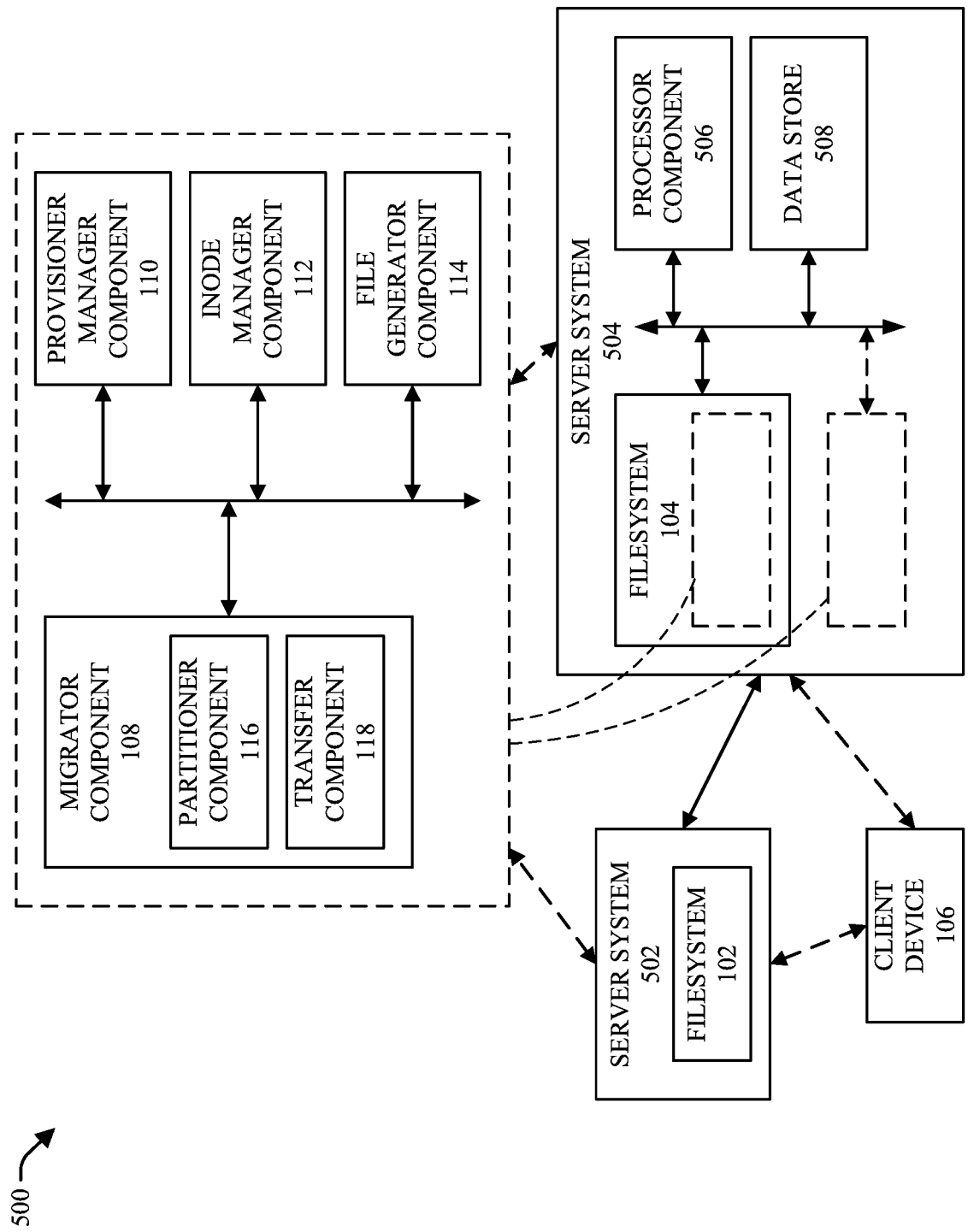
FIG. 5 illustrates a block diagram of a non-limiting example system that can desirably migrate or facilitate migrating (e.g., via in-band migration) information, including files and directories, inode numbers associated with the files and directories, and/or other information relating to the files and directories, from a source filesystem of a server system to a destination filesystem of another server system, in accordance with various aspects and embodiments of the disclosed subject matter.

Turning to FIG. 5, FIG. 5 illustrates a block diagram of a non-limiting example system 500 that can desirably (e.g., efficiently, reliably, suitably, enhancedly, or optimally) migrate or facilitate migrating (e.g., via in-band migration) information, including files and directories, inode numbers associated with the files and directories, and/or other information relating to the files and directories, from a source filesystem of a server system to a destination filesystem of another server system, in accordance with various aspects and embodiments of the disclosed subject matter. The system 500 can comprise the source filesystem 102 and the destination filesystem 104. The system 500 also can comprise the migrator component 108, provisioner manager component 110, inode manager component 112, and/or file generator component 114 that can be associated with (e.g., communicatively connected to) the destination filesystem 104 and/or each other, or can be part of the destination filesystem 104. The respective components (e.g., source filesystem 102, destination filesystem 104, migrator component 108, provisioner manager component 110, inode manager component 112, and/or file generator component 114) can perform respective functions or operations, such as more fully described herein.

In accordance with various embodiments, the source filesystem 102 can be part of a server system 502, which can comprise a server or a server network, comprising a desired number of servers. In accordance with various embodiments, the destination filesystem 104 can be part of a server system 504, which can comprise a server or a server network, comprising a desired number of servers.

The server system 504 can comprise a processor component 506 and a data store 508. In some embodiments, the server system 502 also comprise a processor component and a data store (not shown in FIG. 5). The processor component 506 can work in conjunction with the other components (e.g., migrator component 108, provisioner manager component 110, inode manager component 112, file generator component 114, data store 508, and/or other component) to facilitate performing the various functions and operations of the server system 504. The processor component 506 can employ one or more processors (e.g., one or more CPUs), microprocessors, or controllers that can process information relating to data, files, directories, internal files, internal directories, migration of information, partitioning of the subspace (e.g., inode subspace or other subspace) of the filesystem 104, open file handles, inodes, slices (e.g., inode slices or other slices of a subspace), provisioning of slices, boundary information, applications, services, requests (e.g., migration requests), data processing operations, notifications, alarms, alerts, preferences (e.g., user or client preferences), hash values, metadata, parameters, traffic flows, policies, defined write or file management criteria, algorithms (e.g., migration-related algorithms, subspace partitioning algorithms, slice provisioning algorithms, inode and/or inode number allocation algorithms, search or scanning algorithms, hash algorithms, data compression algorithms, data decompression algorithms, and/or other algorithm), interfaces, protocols, tools, and/or other information, to facilitate operation of the server system 504, and control data flow between the server system 504 and/or other components (e.g., server system 502, a device, node, service, user, or other entity) associated with the server system 504.

The data store 508 can store data structures (e.g., user data, metadata), code structure(s) (e.g., modules, objects, hashes, classes, procedures) or instructions, information relating to data, files, directories, internal files, internal directories, migration of information, partitioning of the subspace (e.g., inode subspace or other subspace) of the filesystem 104, open file handles, inodes, slices (e.g., inode slices or other slices of a subspace), provisioning of slices, boundary information, applications, services, requests (e.g., migration requests), data processing operations, notifications, alarms, alerts, preferences (e.g., user or client preferences), hash values, metadata, parameters, traffic flows, policies, defined write or file management criteria, algorithms (e.g., migration-related algorithms, subspace partitioning algorithms, slice provisioning algorithms, inode and/ or inode number allocation algorithms, search or scanning algorithms, hash algorithms, data compression algorithms, data decompression algorithms, and/or other algorithm), interfaces, protocols, tools, and/or other information, to facilitate controlling or performing operations associated with the server system 504. The data store 508 can comprise volatile and/or non-volatile memory, such as described herein. In an aspect, the processor component 506 can be functionally coupled (e.g., through a memory bus) to the data store 508 in order to store and retrieve information desired to operate and/or confer functionality, at least in part, to the migrator component 108, provisioner manager component 110, inode manager component 112, file generator component 114, processor component 506, data store 508, and/or other component of the server system 504, and/or substantially any other operational aspects of the server system 504.

As disclosed, the data store 508 can comprise volatile memory and/or nonvolatile memory. By way of example and not limitation, nonvolatile memory can include read only memory (ROM), programmable ROM (PROM), electrically programmable ROM (EPROM), electrically erasable ROM (EEPROM), flash memory, non-volatile memory express (NVMe), NVMe over fabric (NVMe-oF), persistent memory (PMEM), or PMEM-oF. Volatile memory can include random access memory (RAM), which can act as external cache memory. By way of example and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory of the disclosed aspects are intended to comprise, without being limited to, these and other suitable types of memory.

It is to be appreciated and understood that the server system 504 can comprise or be associated with various other types of components, such as display screens (e.g., touch screen displays or non-touch screen displays), audio functions (e.g., amplifiers, speakers, or audio interfaces), or other interfaces, to facilitate presentation of information to users, entities, or other components (e.g., other devices or other servers), and/or to perform other desired functions or operations.

The aforementioned systems and/or devices have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component providing aggregate functionality. The components may also interact with one or more other components not specifically described herein for the sake of brevity, but known by those of skill in the art.

In view of the example systems and/or devices described herein, example methods that can be implemented in accordance with the disclosed subject matter can be further appreciated with reference to flowcharts in FIGS. 6-10. For purposes of simplicity of explanation, example methods disclosed herein are presented and described as a series of acts; however, it is to be understood and appreciated that the disclosed subject matter is not limited by the order of acts, as some acts may occur in different orders and/or concurrently with other acts from that shown and described herein. For example, a method disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a method in accordance with the subject specification. It should be further appreciated that the methods disclosed throughout the subject specification are capable of being stored on an article of manufacture to facilitate transporting and transferring such methods to computers for execution by a processor or for storage in a memory.

Figure 6:
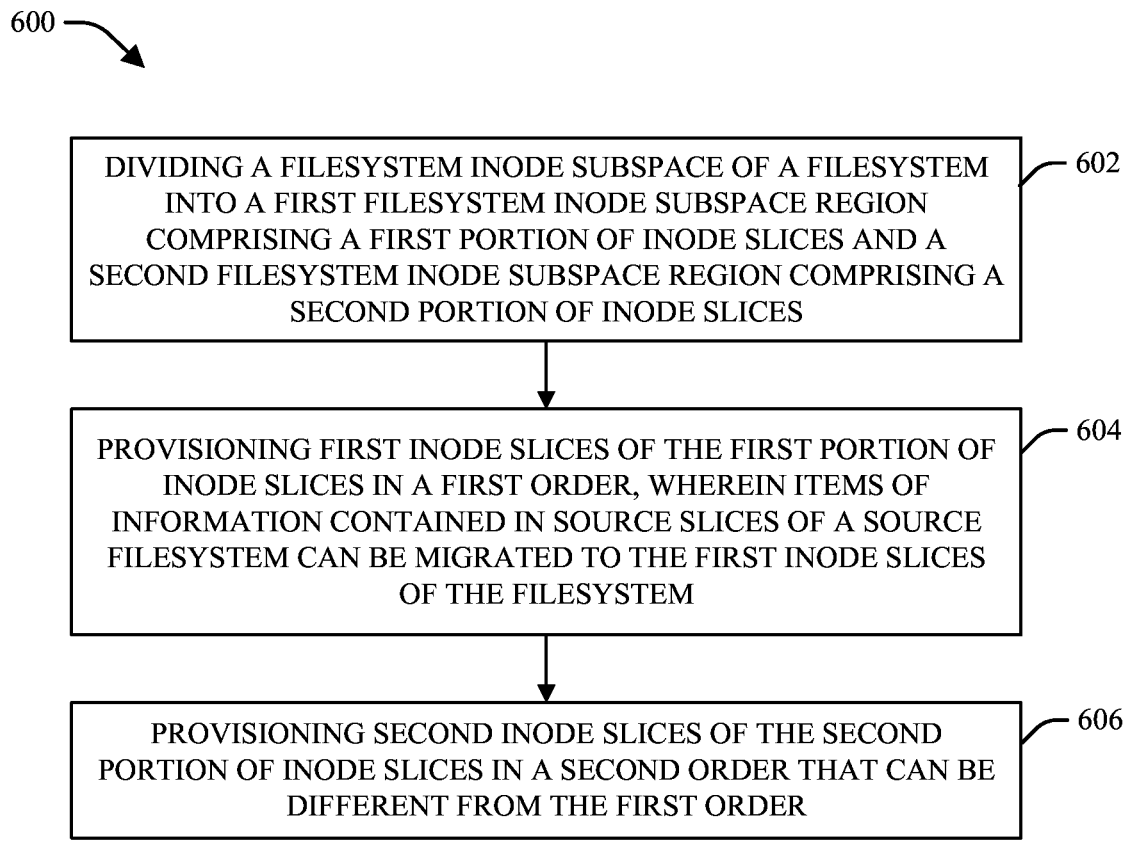
FIG. 6 illustrates a flow chart of an example method that can desirably migrate or facilitate migrating information (e.g., via in-band migration), including files and directories, inode numbers associated with the files and directories, and/or other information relating to the files and directories, from a source filesystem to a destination filesystem, in accordance with various aspects and embodiments of the disclosed subject matter.

FIG. 6 illustrates a flow chart of an example method 600 that can desirably (e.g., efficiently, suitably, enhancedly, or optimally) migrate or facilitate migrating information (e.g., via in-band migration), including files and directories, inode numbers associated with the files and directories, and/or other information relating to the files and directories, from a source filesystem to a destination filesystem, in accordance with various aspects and embodiments of the disclosed subject matter. The method 600 can be employed by, for example, a system comprising the migrator component, provisioner manager component, inode manager component, file generator component, processor component (e.g., of or associated with the migrator component and other components), and/or data store (e.g., of or associated with the migrator component, other components, and/or the processor component).

At 602, a filesystem inode subspace of a filesystem can be divided into a first filesystem inode subspace region comprising a first portion of inode slices and a second filesystem inode subspace region comprising a second portion of inode slices. The migrator component, employing the partitioner component, can divide (e.g., partition) the filesystem inode subspace of the filesystem (e.g., destination filesystem) into the first filesystem inode subspace region comprising the first portion of inode slices and the second filesystem inode subspace region comprising the second portion of inode slices. In some embodiments, the first filesystem inode subspace region and the second filesystem inode subspace region can be variable in size.

At 604, first inode slices of the first portion of inode slices can be provisioned in a first order, wherein items of information contained in source slices of a source filesystem can be migrated to the first inode slices of the filesystem. The migrator component, employing a provisioner manager component, can provision the first inode slices of the first portion of inode slices in the first order, wherein the items of information (e.g., respective CIFS and/or NFS open file handles, comprising respective inode numbers, associated with respective files, respective directories, and/or other respective information) contained in the source slices of the source filesystem can be migrated to the first inode slices of the filesystem. In certain embodiments, the bit sizes and/or sizes of the subspaces of the source filesystem and the destination filesystem can be the same as or similar to each other. In some embodiments, the source filesystem can be active during the migration of the information to the destination filesystem, including migration of the inode numbers, to the first inode slices.

At 606, second inode slices of the second portion of inode slices can be provisioned in a second order that can be different from the first order. The provisioner manager component can provision the second inode slices of the second portion of inode slices in the second order that can be different from the first order. For instance, the first order can have the first inode slices being provisioned based at least in part on an order of the migration of user files and/or directories, inode numbers associated with (e.g., mapped or linked to) the user files and/or directories, and/or the mapping of respective inode numbers of respective inodes to respective first inode slices of the first subgroup of inode slices, such as described herein. The second order can have the second inode slices being provisioned by provisioning a higher (e.g., the highest or last) inode slice number of the subspace following by provisioning a lower (e.g., a next lower) inode slice number in the second filesystem inode subspace region. The provisioner manager component can provision the second inode slices, as and when desired (e.g., wanted or needed), such as, when a second inode slice (e.g., a last or most recently provisioned second inode slice) is determined to be full (e.g., when all of the inode numbers for the second inode slice have been allocated).

Figure 7:
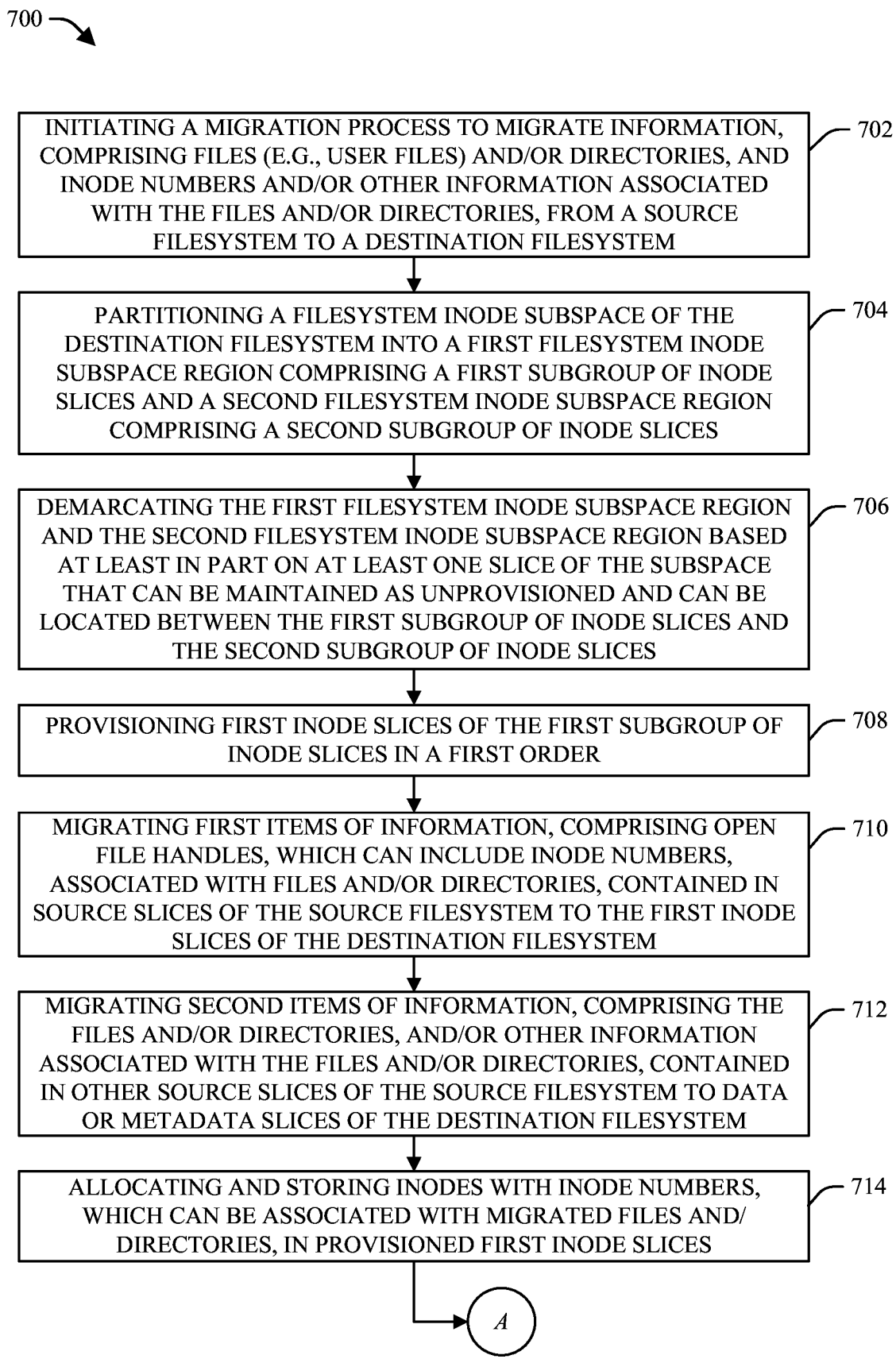
FIGS. 7-8 depict a flow chart of another example method that can desirably migrate or facilitate migrating information (e.g., via in-band migration), including files and directories, inode numbers associated with the files and directories, and/or other information relating to the files and directories, from a source filesystem to a destination filesystem, in accordance with various aspects and embodiments of the disclosed subject matter.
Figure 8:
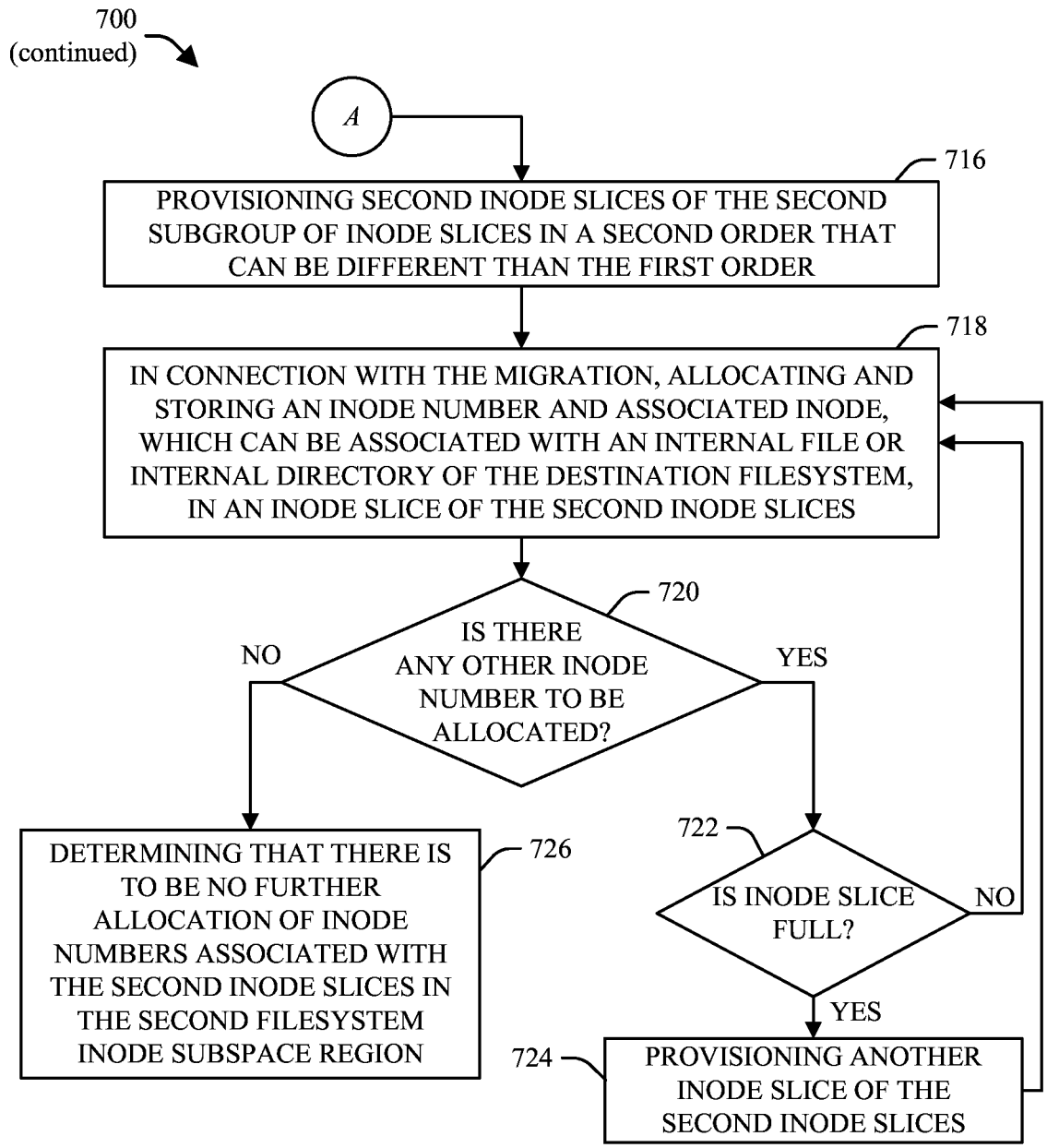

FIGS. 7 and 8 depict a flow chart of another example method 700 that can desirably (e.g., efficiently, suitably, enhancedly, or optimally) migrate or facilitate migrating information (e.g., via in-band migration), including files and directories, inode numbers associated with the files and directories, and/or other information relating to the files and directories, from a source filesystem to a destination filesystem, in accordance with various aspects and embodiments of the disclosed subject matter. The method 700 can be employed by, for example, a system comprising the migrator component, provisioner manager component, inode manager component, file generator component, processor component (e.g., of or associated with the migrator component and other components), and/or data store (e.g., of or associated with the migrator component, other components, and/or the processor component).

At 702, a migration process can be initiated to migrate information, comprising files (e.g., user files) and/or directories, and inode numbers and/or other information associated with the files and/or directories, from a source filesystem to a destination filesystem. The migrator component can initiate the migration process to migrate the information from the source filesystem to the destination filesystem, for example, in response to a request from a device, a user (e.g., a user associated with the device), or another entity, or when otherwise desired. In certain embodiments, the bit sizes and/or sizes of the subspaces of the source filesystem and the destination filesystem can be the same as or similar to each other. In some embodiments, the source filesystem can be active during the migration of the information to the destination filesystem.

At 704, a filesystem inode subspace of the destination filesystem can be partitioned into a first filesystem inode subspace region comprising a first subgroup of inode slices and a second filesystem inode subspace region comprising a second subgroup of inode slices. The migrator component, employing the partitioner component, can partition the filesystem inode subspace of the destination filesystem into the first filesystem inode subspace region, comprising the first subgroup of inode slices, and the second filesystem inode subspace region, comprising the second subgroup of inode slices. In some embodiments, the first filesystem inode subspace region and the second filesystem inode subspace region can be variable in size.

At 706, the first filesystem inode subspace region and the second filesystem inode subspace region can be demarcated based at least in part on at least one slice of the subspace that can be maintained as unprovisioned and can be located between the first subgroup of inode slices and the second subgroup of inode slices. The partitioner component can demarcate the first filesystem inode subspace region and the second filesystem inode subspace region by maintaining at least one slice of the subspace as unprovisioned, wherein at least the one slice can be located between the first subgroup of inode slices and the second subgroup of inode slices.

At 708, first inode slices of the first subgroup of inode slices can be provisioned in a first order. The migrator component, employing a provisioner manager component, can provision the first inode slices of the first subgroup of inode slices of the first filesystem inode subspace region in the first order. The first order can be arranged, structured, or determined (e.g., by the migrator component, inode manager component, provisioner manager component, or other component) based at least in part on an order of the migration of files (e.g., user files) and/or directories from the source filesystem to the destination filesystem, the inode numbers associated with (e.g., mapped or linked to) the files and/or directories, and/or the mapping of respective inode numbers of respective inodes to respective first inode slices of the first subgroup of first inode slices, such as described herein.

At 710, first items of information, comprising open file handles, which can include inode numbers, associated with files (e.g., user files) and/or directories, contained in source slices of the source filesystem can be migrated to the first inode slices of the destination filesystem. The migrator component can migrate (e.g., transfer, move, or communicate) the first items of information from the source filesystem (e.g., from inode slices of the source filesystem) to the first inode slices of the destination filesystem. The migrator component can desirably preserve the open file handles (e.g., CIFS and/or NFS open file handles), including the inode numbers, during the migration of the first items of information to the destination filesystem.

At 712, second items of information, comprising the files and/or directories, and/or other information associated with the files (e.g., user files) and/or directories, contained in other source slices of the source filesystem can be migrated to data or metadata slices of the destination filesystem. As part of the migration process, in addition to migrating the first items of information to the destination filesystem, the migrator component also can migrate the second items of information contained in other source slices of the source filesystem to (e.g., for storage in) the data or metadata slices of the destination filesystem.

At 714, inodes with inode numbers, which can be associated with migrated files and/directories, can be allocated and stored in provisioned first inode slices. In connection with the migrating of the first items of information and the second items of information to the destination filesystem, as respective files (e.g., user files) or respective directories and their associated respective inode numbers are migrated to the destination filesystem, the inode manager component can allocate respective inodes with their respective inode numbers, which can be associated with the respective user files or respective directories, to respective first inode slices based at least in part on the mapping of respective inode numbers of respective inodes to respective first inode slices. The provisioner manager component can provision the respective first inode slices, if and as desired (e.g., wanted, needed, or otherwise desired), in the first order, to facilitate storage of the respective inodes with the respective inode numbers in the respective first inode slices (e.g., provisioned first inode slices). The inode manager component can store the respective inodes with the respective inode numbers in the respective first inode slices. At this point, the method 700 can proceed to reference point A, wherein the method 700 can continue from reference point A, as shown in FIG. 8 and described herein.

At 716, second inode slices of the second subgroup of inode slices can be provisioned in a second order that can be different than the first order. The provisioner manager component can provision the second inode slices of the second subgroup of inode slices of the second filesystem inode subspace region in the second order that can be different than (e.g., distinguishable or distinct from) the first order. For example, the provisioner manager component can provision the second inode slices of the second subgroup of inode slices in the second order from a highest (e.g., last) or higher inode slice number to a lower inode slice number with regard to slices in the second filesystem inode subspace region.

At 718, in connection with the migration, an inode number and associated inode, which can be associated with an internal file or internal directory of the destination filesystem, can be allocated and stored in an inode slice of the second inode slices. The migrator component, employing the inode manager component, can allocate the inode number, and associated (e.g., corresponding) inode, that can be associated with internal file or internal directory being generated (e.g., by the migrator component or another component of the destination filesystem) in connection with the migration of the information from the source filesystem to the destination filesystem. The inode number and associated inode can be stored in an inode slice of the second inode slices, wherein the inode slice can be a provisioned inode slice, as provisioned by the provisioner manager component. The migrator component can start by storing inode numbers and associated inodes in the last inode slice or other desired higher numbered inode slice of the second inode slices that is first provisioned by the provisioner manager component.

At 720, a determination can be made regarding whether there is any other inode number to be allocated and stored in an inode slice of the second inode slices. For instance, the migrator component can determine whether there is any other inode number and associated inode to be allocated and stored in an inode slice of the second inode slices.

If it is determined that there is another inode number and associated inode to be allocated and stored in an inode slice of the second inode slices, at 722, a determination can be made regarding whether the inode slice is full. In some embodiments, the migrator component or the provisioner manager component can determine whether the inode slice is full.

If it is determined that the inode slice is not full, the method 700 can return to reference numeral 718, where another inode number and associated inode, which can be associated with another internal file or internal directory of the destination filesystem, can be allocated and stored in the inode slice, and the method 700 can proceed from that point. For example, if the migrator component or the provisioner manager component determines that the inode slice is not full, the migrator component can generate another internal file or another internal directory, the inode manager component can allocate another inode number and associated inode, which can be associated with the other internal file or other internal directory of the destination filesystem, and such inode with such other inode number can be stored in the inode slice.

If, instead, at 722, it is determined that the inode slice is full, at 724, another inode slice of the second inode slices can be provisioned. For instance, if the migrator component or the provisioner manager component determines that the inode slice is full (e.g., all of the inode numbers for that inode slice have been allocated and stored in that inode slice), the provisioner manager component can provision another inode slice of the second inode slices of the second filesystem inode subspace region. At this point, the method 700 can return to reference numeral 718, where the other inode number and associated inode, which can be associated with the other internal file or internal directory of the destination filesystem, can be allocated and stored in the inode slice, and the method 700 can proceed from that point. In some embodiments, if and as desired (e.g., as wanted, needed, or otherwise desired), the migrator component can generate another internal file or another internal directory, the inode manager component can allocate the other inode number and associated inode, which can be associated with the other internal file or other internal directory of the destination filesystem, and such inode with such other inode number can be stored in the inode slice (e.g., the newly or recently provisioned inode slice).

Referring again to reference numeral 720, if, at 720, it is determined that there is not another inode number and associated inode to be allocated and stored in an inode slice of the second inode slices, at 726, it can be determined that there is to be no further allocation of inode numbers associated with the second inode slices in the second filesystem inode subspace region. For instance, if the migrator component or inode manager component determines that there is not another inode number and associated inode to be allocated and stored in an inode slice of the second inode slices of the second filesystem inode subspace region, the migrator component or inode manager component can determine that there is to be no further allocation of inode numbers associated with the second inode slices in the second filesystem inode subspace region, and can prevent further allocation of inode numbers associated with the second inode slices in the second filesystem inode subspace region. In some embodiments, after it is determined that the migration to the destination filesystem is complete, the migrator component can cut over or facilitate cutting over from the source filesystem to the destination filesystem to allow the client(s) to utilize the destination filesystem, and, post migration completion, if and as desired (e.g., wanted, needed, or otherwise desired), inodes with inode numbers associated with internal files or internal directories can be allocated (e.g., by the inode manager component) and stored in provisioned first inode slices in the first filesystem inode subspace region in connection with the generation of such internal files or internal directories, such as described herein.

Figure 9:
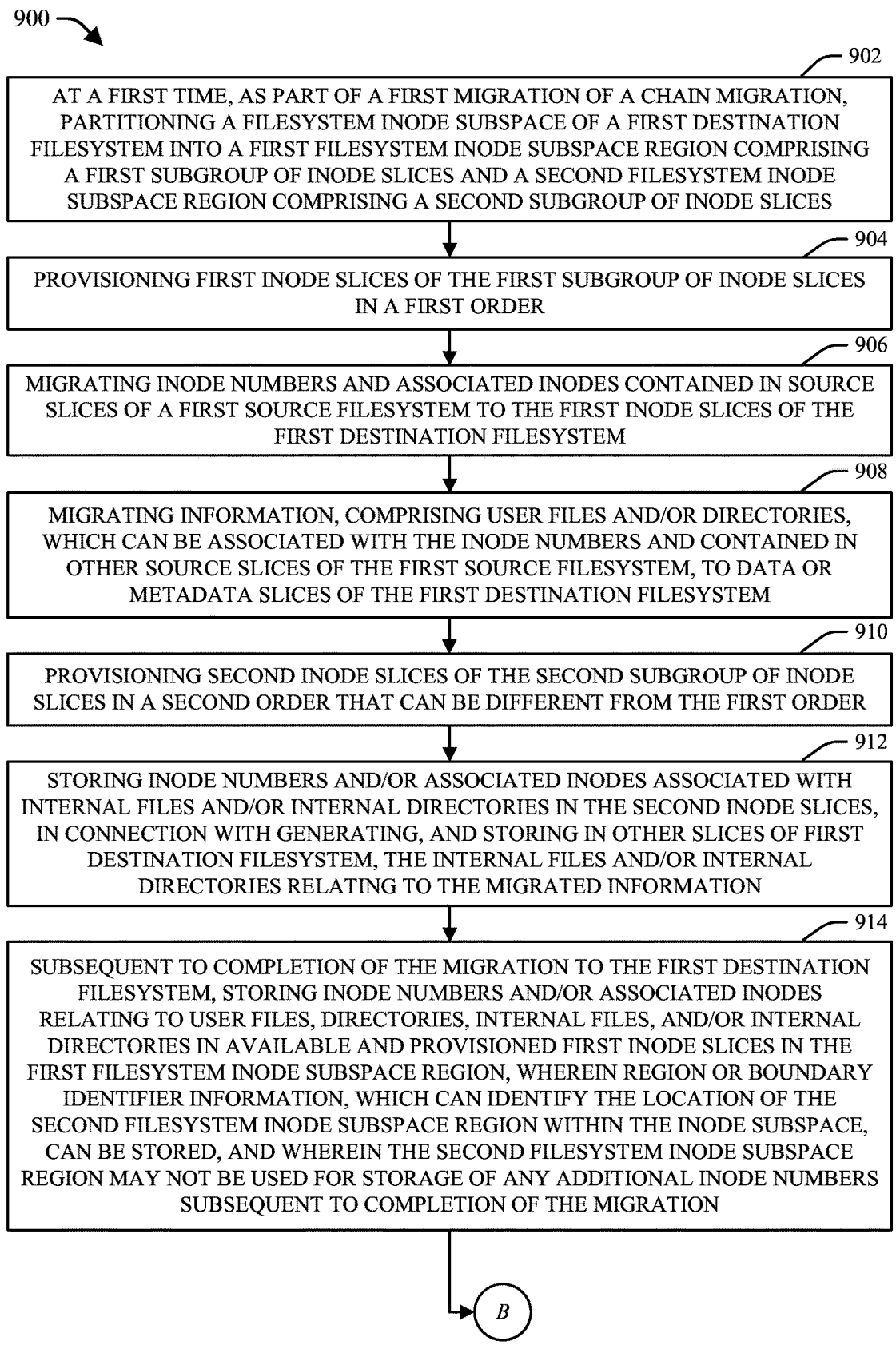
FIGS. 9 and 10 illustrate a flow chart of an example method that can desirably perform or facilitate performing a chain migration (e.g., via in-band migration) of respective information from a first source filesystem to a first destination filesystem, and from the first destination filesystem (as a second source filesystem) to a second destination filesystem, in accordance with various aspects and embodiments of the disclosed subject matter.
Figure 10:
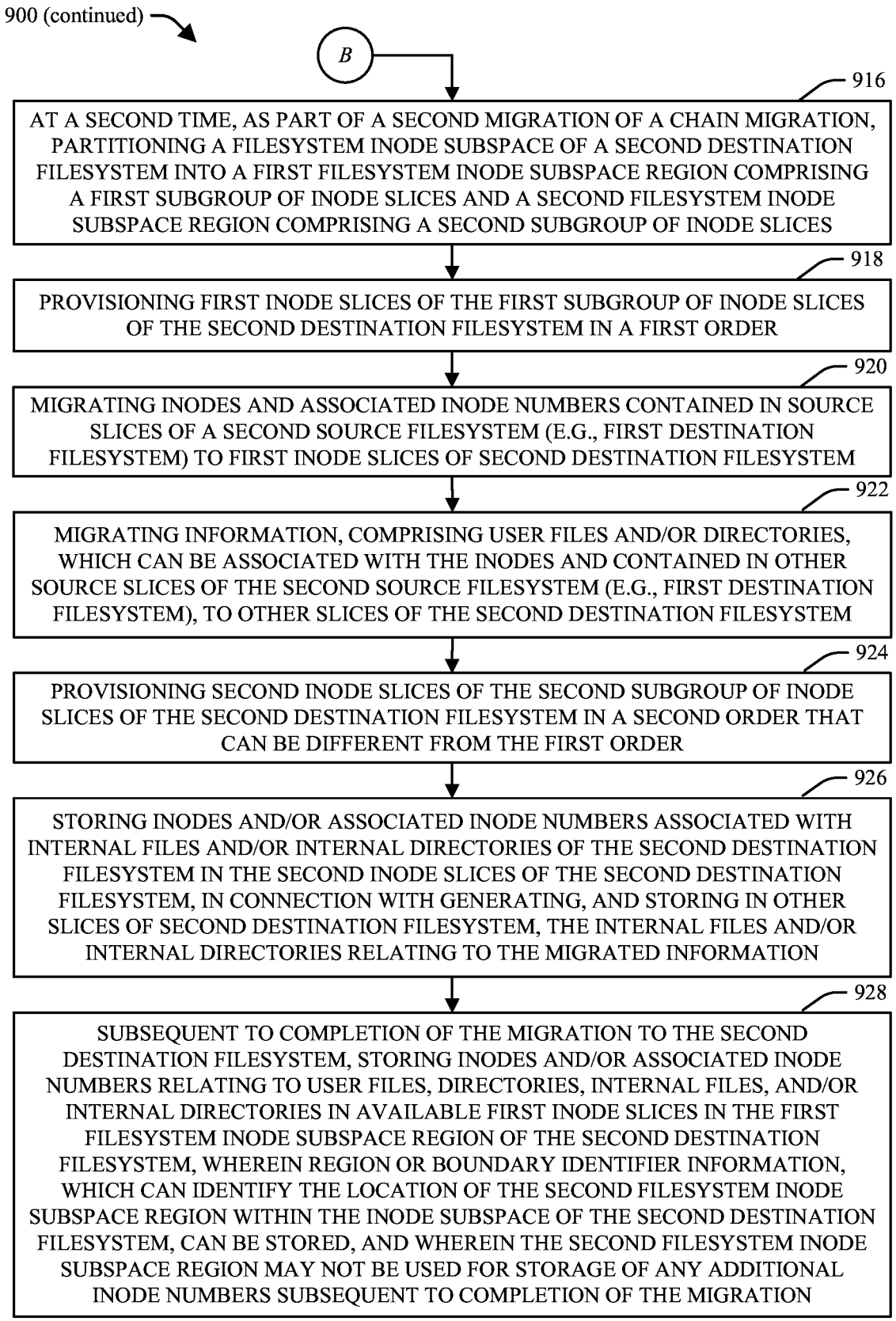

FIGS. 9 and 10 illustrate a flow chart of an example method 900 that can desirably (e.g., efficiently, suitably, enhancedly, or optimally) perform or facilitate performing a chain migration (e.g., via in-band migration) of respective information from a first source filesystem to a first destination filesystem, and from the first destination filesystem (as a second source filesystem) to a second destination filesystem, in accordance with various aspects and embodiments of the disclosed subject matter. The method 900 can be employed by, for example, a system comprising the migrator component, provisioner manager component, inode manager component, file generator component, processor component (e.g., of or associated with the migrator component and other components), and/or data store (e.g., of or associated with the migrator component, other components, and/or the processor component).

At 902, at a first time, as part of a first migration of a chain migration, a filesystem inode subspace of a first destination filesystem can be partitioned into a first filesystem inode subspace region comprising a first subgroup of inode slices and a second filesystem inode subspace region comprising a second subgroup of inode slices. The migrator component (of or associated with the second destination filesystem), employing the partitioner component, can partition the filesystem inode subspace of the first destination filesystem into the first filesystem inode subspace region comprising the first subgroup of inode slices and the second filesystem inode subspace region comprising the second subgroup of inode slices. In some embodiments, the first filesystem inode subspace region and the second filesystem inode subspace region can be variable in size.

At 904, first inode slices of the first subgroup of inode slices can be provisioned in a first order. At 906, inode numbers and associated inodes contained in source slices of a first source filesystem can be migrated to the first inode slices of the first destination filesystem. At 908, information, comprising user files and/or directories, which can be associated with the inode numbers and contained in other source slices of the first source filesystem, can be migrated to data or metadata slices of the first destination filesystem. The migrator component, employing a provisioner manager component, can provision the first inode slices of the first subgroup of inode slices in the first order. Items of information (e.g., respective CIFS and/or NFS open file handles, comprising respective inode numbers, associated with respective user files, respective directories, and/or other respective information (e.g., respective inodes) contained in the source slices of the first source filesystem can be migrated to the first inode slices of the first destination filesystem, such as described herein. The migrator component also can migrate (e.g., transfer) other information, such as the user files and/or directories, which can be associated with the inode numbers and contained in the other source slices of the first source filesystem, to the data or metadata slices of the first destination filesystem. In certain embodiments, the bit sizes and/or sizes of the subspaces of the first source filesystem and the first destination filesystem can be the same as or similar to each other. In other embodiments, the bit sizes and/or sizes of the subspaces of the first source filesystem and the first destination filesystem can be different from each other. In some embodiments, the first source filesystem can be active during the migration of the information to the first destination filesystem, including migration of the inode numbers and associated inodes, to the first inode slices.

At 910, second inode slices of the second subgroup of inode slices can be provisioned in a second order that can be different from the first order. The provisioner manager component can provision the second inode slices of the second subgroup of inode slices in the second order that can be different from (e.g., opposite of or otherwise different from) the first order, such as described herein. The provisioner manager component can provision the second inode slices, as and when desired (e.g., wanted or needed), such as, when a second inode slice (e.g., a last or most recently provisioned second inode slice) is determined to be full.

At 912, inode numbers and/or associated inodes, which can be associated with internal files and/or internal directories, can be stored in the second inode slices, in connection with generating, and storing in other slices of first destination filesystem, the internal files and/or internal directories relating to the migrated information. As part of the migration to the first destination filesystem, the migrator component can allocate inode numbers and/or associated inodes, which can be associated with the internal files and/or internal directories, and can store the inode numbers and/or associated inodes in the second inode slices of the second filesystem inode subspace region, in connection with generating, and storing in the other slices of first destination filesystem, the internal files and/or internal directories relating to the migrated information.

At 914, subsequent to completion of the migration to the first destination filesystem, inode numbers and/or associated inodes relating to user files, directories, internal files, and/or internal directories can be stored in available and provisioned first inode slices in the first filesystem inode subspace region, wherein region or boundary identifier information, which can identify the location of the second filesystem inode subspace region within the inode subspace, can be stored, and wherein the second filesystem inode subspace region may not be used for storage of any additional inode numbers subsequent to completion of the migration. For instance, subsequent to the completion of the migration to the first destination filesystem, the first destination filesystem can allocate inode numbers and/or associated inodes relating to user files, directories, internal files, and/or internal directories, and can store those inode numbers and/or associated inodes in available and provisioned first inode slices in the first filesystem inode subspace region of the first destination filesystem, in connection with generating the user files, directories, internal files, and/or internal directories, and storing the user files, directories, internal files, and/or internal directories in the first destination filesystem. The provisioner manager component can manage the provisioning of inode slices or other slices of the first destination filesystem to provision such slices when desired (e.g., when a provisioned slice is full and provisioning of another slice is wanted, needed, or otherwise desired to store inodes and/or other information). In some embodiments, subsequent to completion of the migration to the first destination filesystem, it can be desired (e.g., wanted, needed, or otherwise desired) that the second filesystem inode subspace region no longer be used for storage of any additional inode numbers or inodes. This can facilitate chain migration of information, if desired, since only the first filesystem inode subspace region can contain any information that may be migrated to another destination filesystem. To facilitate identifying where the second filesystem inode subspace region is located within the inode subspace, the region or boundary identifier information, which can identify the location of the unprovisioned (e.g., demarcation or boundary) slice and/or the location (e.g., the starting or first inode slice and/or the ending or last inode slice) of the second filesystem inode subspace region within the inode subspace, can be stored in memory of the first destination filesystem, and can be utilized to identify where the second filesystem inode subspace region is located within the inode subspace. At this point, the method 900 can proceed to reference point B, wherein the method 900 can continue from reference point B, as shown in FIG. 10 and described herein.

At 916, at a second time, as part of a second migration of a chain migration, a filesystem inode subspace of a second destination filesystem can be partitioned into a first filesystem inode subspace region comprising a first subgroup of inode slices and a second filesystem inode subspace region comprising a second subgroup of inode slices. At a second time (e.g., subsequent to the first time), the migrator component (of or associated with the second destination filesystem), employing the partitioner component, can partition the filesystem inode subspace of the second destination filesystem into the first filesystem inode subspace region comprising the first subgroup of inode slices and the second filesystem inode subspace region comprising the second subgroup of inode slices.

At 918, first inode slices of the first subgroup of inode slices of the second destination filesystem can be provisioned in a first order. At 920, inode numbers and associated inodes contained in source slices of a second source filesystem (e.g., the first destination filesystem) can be migrated to the first inode slices of the second destination filesystem. At 922, information, comprising user files and/or directories, which can be associated with the inode numbers and contained in other source slices of the second source filesystem (e.g., the first destination filesystem), can be migrated to data or metadata slices of the second destination filesystem. The migrator component, employing a provisioner manager component, can provision the first inode slices of the first subgroup of inode slices in the first order. Items of information (e.g., respective CIFS and/or NFS open file handles, comprising respective inode numbers, associated with respective user files, respective directories, and/or other respective information (e.g., respective inodes)) contained in the source slices of the second source filesystem can be migrated to the first inode slices of the second destination filesystem. The migrator component also can migrate (e.g., transfer) other information, such as the user files and/or directories, which can be associated with the inode numbers and contained in other (e.g., data or metadata) source slices of the second source filesystem, to the other slices of the second destination filesystem. In some embodiments, the bit sizes and/or sizes of the subspaces of the second source filesystem and the second destination filesystem can be the same as or similar to each other. In other embodiments, the bit sizes and/or sizes of the subspaces of the second source filesystem and the second destination filesystem can be different from each other. In certain embodiments, the second source filesystem can be active during the migration of the information to the second destination filesystem, including migration of the inodes and associated inode numbers, to the first inode slices of the first filesystem inode subspace region of the second destination filesystem.

At 924, second inode slices of the second subgroup of inode slices of the second destination filesystem can be provisioned in a second order that can be different from the first order. The provisioner manager component can provision the second inode slices of the second subgroup of inode slices in the second order that can be different from (e.g., opposite of or otherwise different from) the first order, such as described herein. The provisioner manager component can provision the second inode slices, as and when desired (e.g., wanted or needed), such as, when a second inode slice (e.g., a last or most recently provisioned second inode slice) is determined to be full.

At 926, inode numbers and/or associated inodes, which can be associated with internal files and/or internal directories of the second destination filesystem, can be stored in the second inode slices of the second destination filesystem, in connection with generating, and storing in other slices of second destination filesystem, the internal files and/or internal directories relating to the migrated information. As part of the migration to the second destination filesystem, the migrator component can allocate inode numbers and/or associated inodes that can be associated with the internal files and/or internal directories, and can store the inode numbers and/or associated inodes in the second inode slices of the second filesystem inode subspace region of the second destination filesystem, in connection with generating, and storing in the other slices of the second destination filesystem, the internal files and/or internal directories relating to the migrated information.

At 928, subsequent to completion of the migration to the second destination filesystem, inode numbers and/or associated inodes relating to user files, directories, internal files, and/or internal directories can be stored in available first inode slices in the first filesystem inode subspace region of the second destination filesystem, wherein region or boundary identifier information, which can identify the location of the second filesystem inode subspace region within the inode subspace of the second destination filesystem, can be stored, and wherein the second filesystem inode subspace region may not be used for storage of any additional inode numbers subsequent to completion of the migration to the second destination filesystem. For instance, subsequent to the completion of the migration to the second destination filesystem, the second destination filesystem can allocate inodes and/or associated inode numbers relating to user files, directories, internal files, and/or internal directories, and can store those inodes and/or associated inode numbers in available first inode slices in the first filesystem inode subspace region of the second destination filesystem, in connection with generating the user files, directories, internal files, and/or internal directories, and storing the user files, directories, internal files, and/or internal directories in the second destination filesystem. In certain embodiments, subsequent to completion of the migration to the second destination filesystem, it can be desirable (e.g., wanted, needed, or otherwise desired) for the second filesystem inode subspace region of the inode subspace of the second destination filesystem to no longer be used for storage of any additional inode numbers or inodes. This can facilitate chain migration of information, if desired, since only the first filesystem inode subspace region of the inode subspace of the second destination filesystem can contain any information that may be migrated to another destination filesystem, such as described herein. To facilitate identifying where the second filesystem inode subspace region is located within the inode subspace of the second destination filesystem, region or boundary identifier information, which can identify the location of the unprovisioned (e.g., demarcation) slice and/or the location (e.g., the starting or first inode slice and/or the ending or last inode slice) of the second filesystem inode subspace region within the inode subspace of the second destination filesystem, can be stored in memory of the second destination filesystem, and can be utilized to identify where the second filesystem inode subspace region is located within the inode subspace of the second destination filesystem. It is to be appreciated and understood that the disclosed subject matter, employing the migrator component and other components, such as described herein, can perform chain migration of information from a source filesystem to a destination filesystem as many times as desired (e.g., wanted, needed, or otherwise desired), such as migration of information from a first filesystem to a second filesystem, and subsequently, migration of information from the second filesystem to a third filesystem, and/or subsequently, migration of information from the third filesystem to a fourth filesystem, and/or subsequently, one or more other migrations of information from a source filesystem to a destination filesystem.

Figure 11:
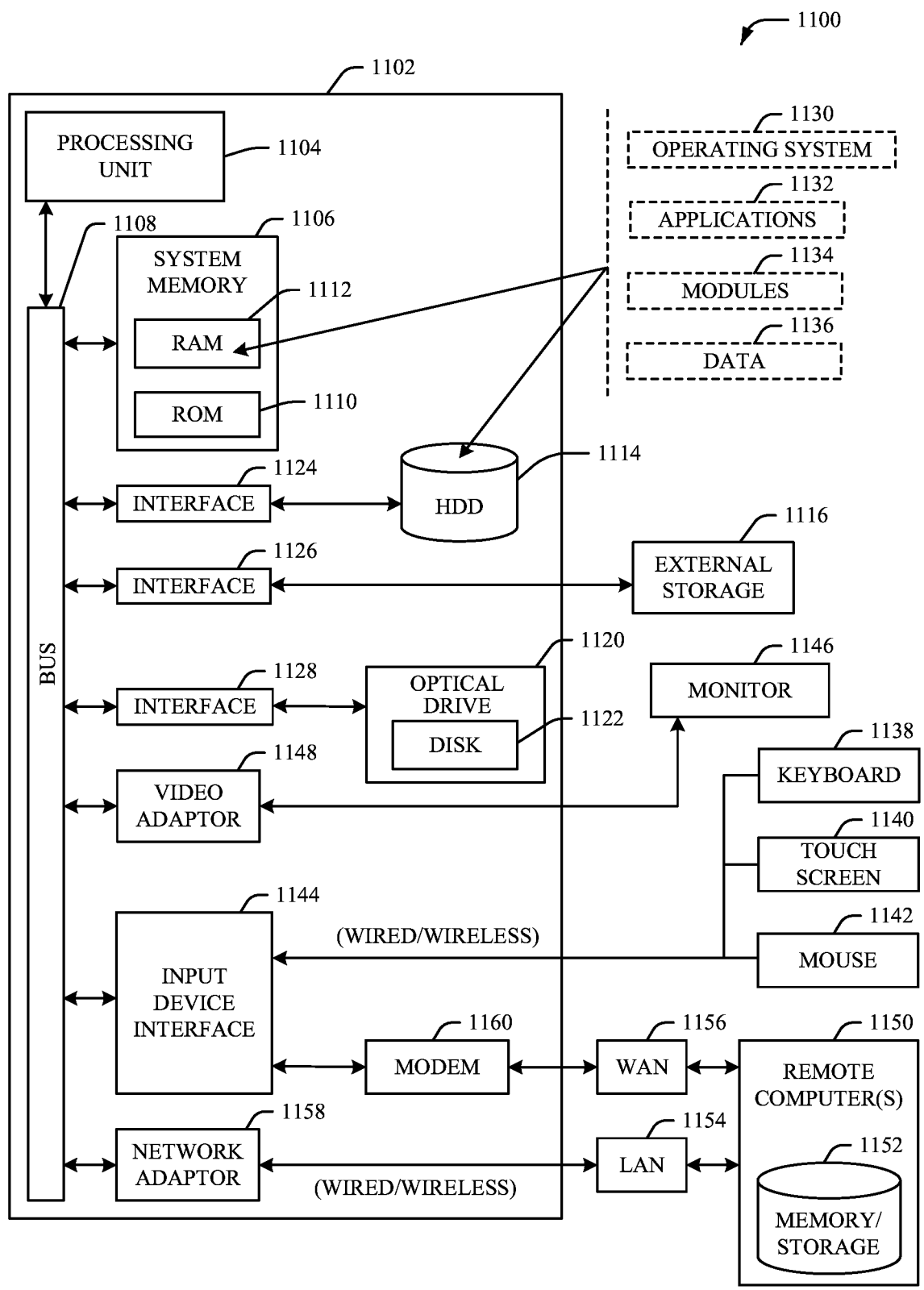
FIG. 11 illustrates an example block diagram of an example computing environment in which the various embodiments of the embodiments described herein can be implemented.

In order to provide additional context for various embodiments described herein, FIG. 11 and the following discussion are intended to provide a brief, general description of a suitable computing environment 1100 in which the various embodiments of the embodiments described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 11, the example environment 1100 for implementing various embodiments of the aspects described herein includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors. Dual microprocessors and other multi-processor architectures can also be employed as the processing unit 1104.

The system bus 1108 can be any of several types of bus structure that can further interconnect to a memory bus (with or without a memory controller), a peripheral bus, and a local bus using any of a variety of commercially available bus architectures. The system memory 1106 includes ROM 1110 and RAM 1112. A basic input/output system (BIOS) can be stored in a non-volatile memory such as ROM, erasable programmable read only memory (EPROM), EEPROM, which BIOS contains the basic routines that help to transfer information between elements within the computer 1102, such as during startup. The RAM 1112 can also include a high-speed RAM such as static RAM for caching data.

The computer 1102 further includes an internal hard disk drive (HDD) 1114 (e.g., EIDE, SATA), one or more external storage devices 1116 (e.g., a magnetic floppy disk drive (FDD) 1116, a memory stick or flash drive reader, a memory card reader, etc.) and an optical disk drive 1120 (e.g., which can read or write from a CD-ROM disc, a DVD, a BD, etc.). While the internal HDD 1114 is illustrated as located within the computer 1102, the internal HDD 1114 can also be configured for external use in a suitable chassis (not shown). Additionally, while not shown in environment 1100, a solid state drive (SSD) could be used in addition to, or in place of, an HDD 1114. The HDD 1114, external storage device(s) 1116 and optical disk drive 1120 can be connected to the system bus 1108 by an HDD interface 1124, an external storage interface 1126 and an optical drive interface 1128, respectively. The interface 1124 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1102, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. The systems and methods described herein can be implemented utilizing various commercially available operating systems or combinations of operating systems.

Computer 1102 can optionally comprise emulation technologies. For example, a hypervisor (not shown) or other intermediary can emulate a hardware environment for operating system 1130, and the emulated hardware can optionally be different from the hardware illustrated in FIG. 11. In such an embodiment, operating system 1130 can comprise one virtual machine (VM) of multiple VMs hosted at computer 1102. Furthermore, operating system 1130 can provide runtime environments, such as the Java runtime environment or the .NET framework, for applications 1132. Runtime environments are consistent execution environments that allow applications 1132 to run on any operating system that includes the runtime environment. Similarly, operating system 1130 can support containers, and applications 1132 can be in the form of containers, which are lightweight, standalone, executable packages of software that include, e.g., code, runtime, system tools, system libraries and settings for an application.

Further, computer 1102 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1102, e.g., applied at the application execution level or at the operating system (OS) kernel level, thereby enabling security at any level of code execution.

A user can enter commands and information into the computer 1102 through one or more wired/wireless input devices, e.g., a keyboard 1138, a touch screen 1140, and a pointing device, such as a mouse 1142. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1104 through an input device interface 1144 that can be coupled to the system bus 1108, but can be connected by other interfaces, such as a parallel port, an IEEE 1394 serial port, a game port, a USB port, an IR interface, a BLUETOOTH® interface, etc.

A monitor 1146 or other type of display device can be also connected to the system bus 1108 via an interface, such as a video adapter 1148. In addition to the monitor 1146, a computer typically includes other peripheral output devices (not shown), such as speakers, printers, etc.

The computer 1102 can operate in a networked environment using logical connections via wired and/or wireless communications to one or more remote computers, such as a remote computer(s) 1150. The remote computer(s) 1150 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1152 is illustrated. The logical connections depicted include wired/wireless connectivity to a local area network (LAN) 1154 and/or larger networks, e.g., a wide area network (WAN) 1156. Such LAN and WAN networking environments are commonplace in offices and companies, and facilitate enterprise-wide computer networks, such as intranets, all of which can connect to a global communications network, e.g., the Internet.

When used in a LAN networking environment, the computer 1102 can be connected to the local network 1154 through a wired and/or wireless communication network interface or adapter 1158. The adapter 1158 can facilitate wired or wireless communication to the LAN 1154, which can also include a wireless access point (AP) disposed thereon for communicating with the adapter 1158 in a wireless mode.

When used in a WAN networking environment, the computer 1102 can include a modem 1160 or can be connected to a communications server on the WAN 1156 via other means for establishing communications over the WAN 1156, such as by way of the Internet. The modem 1160, which can be internal or external and a wired or wireless device, can be connected to the system bus 1108 via the input device interface 1144. In a networked environment, program modules depicted relative to the computer 1102 or portions thereof, can be stored in the remote memory/storage device 1152. It will be appreciated that the network connections shown are example and other means of establishing a communications link between the computers can be used.

When used in either a LAN or WAN networking environment, the computer 1102 can access cloud storage systems or other network-based storage systems in addition to, or in place of, external storage devices 1116 as described above. Generally, a connection between the computer 1102 and a cloud storage system can be established over a LAN 1154 or WAN 1156, e.g., by the adapter 1158 or modem 1160, respectively. Upon connecting the computer 1102 to an associated cloud storage system, the external storage interface 1126 can, with the aid of the adapter 1158 and/or modem 1160, manage storage provided by the cloud storage system as it would other types of external storage. For instance, the external storage interface 1126 can be configured to provide access to cloud storage sources as if those sources were physically connected to the computer 1102.

The computer 1102 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Wi-Fi, or Wireless Fidelity, allows connection to the Internet from a couch at home, in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHZ radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Various aspects or features described herein can be implemented as a method, apparatus, system, or article of manufacture using standard programming or engineering techniques. In addition, various aspects or features disclosed in the subject specification can also be realized through program modules that implement at least one or more of the methods disclosed herein, the program modules being stored in a memory and executed by at least a processor. Other combinations of hardware and software or hardware and firmware can enable or implement aspects described herein, including disclosed method(s). The term "article of manufacture" as used herein is intended to encompass a computer program accessible from any computer-readable device, carrier, or storage media. For example, computer-readable storage media can include but are not limited to magnetic storage devices (e.g., hard disk, floppy disk, magnetic strips, etc.), optical discs (e.g., compact disc (CD), digital versatile disc (DVD), blu-ray disc (BD), etc.), smart cards, and memory devices comprising volatile memory and/or nonvolatile memory (e.g., flash memory devices, such as, for example, card, stick, key drive, etc.), or the like. In accordance with various implementations, computer-readable storage media can be non-transitory computer-readable storage media and/or a computer-readable storage device can comprise computer-readable storage media.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. A processor can be or can comprise, for example, multiple processors that can include distributed processors or parallel processors in a single machine or multiple machines. Additionally, a processor can comprise or refer to an integrated circuit, an application specific integrated circuit (ASIC), a digital signal processor (DSP), a programmable gate array (PGA), a field programmable gate array (FPGA), a programmable logic controller (PLC), a complex programmable logic device (CPLD), a state machine, a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor may also be implemented as a combination of computing processing units.

A processor can facilitate performing various types of operations, for example, by executing computer-executable instructions. When a processor executes instructions to perform operations, this can include the processor performing (e.g., directly performing) the operations and/or the processor indirectly performing operations, for example, by facilitating (e.g., facilitating operation of), directing, controlling, or cooperating with one or more other devices or components to perform the operations. In some implementations, a memory can store computer-executable instructions, and a processor can be communicatively coupled to the memory, wherein the processor can access or retrieve computer-executable instructions from the memory and can facilitate execution of the computer-executable instructions to perform operations.

In certain implementations, a processor can be or can comprise one or more processors that can be utilized in supporting a virtualized computing environment or virtualized processing environment. The virtualized computing environment may support one or more virtual machines representing computers, servers, or other computing devices. In such virtualized virtual machines, components such as processors and storage devices may be virtualized or logically represented.

In the subject specification, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory.

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

As used in this application, the terms "component," "system," "platform," "framework," "layer," "interface," "agent," and the like, can refer to and/or can include a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, computer-executable instructions, a program, and/or a computer. By way of illustration, both an application running on a server and the server can be a component. One or more components may reside within a process and/or thread of execution and a component may be localized on one computer and/or distributed between two or more computers.

In another example, respective components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

A communication device, such as described herein, can be or can comprise, for example, a computer, a laptop computer, a server, a phone (e.g., a smart phone), an electronic pad or tablet, an electronic gaming device, electronic headwear or bodywear (e.g., electronic eyeglasses, smart watch, augmented reality (AR)/virtual reality (VR) headset, or other type of electronic headwear or bodywear), a set-top box, an Internet Protocol (IP) television (IPTV), Internet of things (IoT) device (e.g., medical device, electronic speaker with voice controller, camera device, security device, tracking device, appliance, or other IoT device), or other desired type of communication device.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

As used herein, the terms "example," "exemplary," and/or "demonstrative" are utilized to mean serving as an example, instance, or illustration. For the avoidance of doubt, the subject matter disclosed herein is not limited by such examples. In addition, any aspect or design described herein as an "example," "exemplary," and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive, in a manner similar to the term "comprising" as an open transition word, without precluding any additional or other elements.

It is to be appreciated and understood that components (e.g., device, server, server system node, migrator component, inode manager component, provisioner, manager component, file generator component, communication network, service, processor component, data store, or other component), as described with regard to a particular system or method, can include the same or similar functionality as respective components (e.g., respectively named components or similarly named components) as described with regard to other systems or methods disclosed herein.

What has been described above includes examples of systems and methods that provide advantages of the disclosed subject matter. It is, of course, not possible to describe every conceivable combination of components or methods for purposes of describing the disclosed subject matter, but one of ordinary skill in the art may recognize that many further combinations and permutations of the disclosed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A method, comprising:
dividing, by a system comprising at least one processor, a filesystem inode subspace of a filesystem into a first filesystem inode subspace region comprising a first portion of inode slices and a second filesystem inode subspace region comprising a second portion of inode slices, wherein items of information comprise at least one of user files, directories, or inode numbers, and wherein the first portion of inode slices is associated with lower inode slice numbers than higher inode slice numbers associated with the second portion of inode slices;
during a migration of the items of information, provisioning, by the system, first inode slices of the first portion of inode slices in a first order that is arranged or determined based at least in part on a third order of migration of the user files or the directories from a source filesystem to the filesystem, wherein the items of information contained in source slices of the source filesystem are migrated to the first inode slices of the filesystem, and wherein the inode numbers are associated with the user files or the directories, or a mapping of the inode numbers to the first inode slices; and
during or in connection with the migration of the items of information, provisioning, by the system, second inode slices of the second portion of inode slices in a second order with a higher numbered second inode slice being provisioned prior to a next lower numbered second inode slice being provisioned, wherein the next lower numbered second inode slice is lower in number than and adjacent to the higher numbered second inode slice, and wherein the second order is different from the first order.

2. The method of claim 1, further comprising:
in response to determining that the migrating of the items of information to the first inode slices of the filesystem is complete, transitioning, by the system, from the source filesystem to the filesystem, without interruption of service to at least one client device associated with the source filesystem, to enable the at least one client device to access at least some of the items of information from the filesystem.

3. The method of claim 1, wherein a highest numbered second inode slice, or the higher numbered second inode slice that is lower in number than and within a defined number of slices of the highest numbered second inode slice, is a second inode slice, of the second inode slices, that is first to be provisioned in the second filesystem inode subspace region.

4. The method of claim 1, wherein the provisioning of the second inode slices in the second order comprises:
provisioning the higher numbered second inode slice;
allocating a first group of inode numbers associated with the higher numbered second inode slice;
in response to determining that no storage space is available in the higher numbered second inode slice, provisioning the next lower numbered second inode slice; and
allocating a second group of inode numbers associated with the next lower numbered second inode slice.

5. The method of claim 1, wherein the first filesystem inode subspace region and the second filesystem inode subspace region are variable in size.

6. The method of claim 1, wherein the items of information are first items of information, and wherein the method further comprises:
    initiating, by the system, migrating of the first items of information, comprising common-internet-file-system and network-file-system open file handles associated with the user files and the directories, from the source slices of the source filesystem for storage in the first inode slices of the first portion of inode slices of the filesystem, wherein the common-internet-file-system and the network-file-system open file handles, comprising the inode numbers associated with the user files or the directories, are preserved during and after the migrating of the items of information for storage in the first inode slices of the first portion of inode slices of the filesystem; and
    initiating, by the system, migrating of second items of information, comprising or relating to the user files and the directories, from the source slices of the source filesystem for storage in data slices or metadata slices of the filesystem, wherein the source filesystem is active during the migrating of the first items of information and the migrating of the second items of information.

7. The method of claim 6, wherein the inode numbers are first inode numbers, and wherein the method further comprises:
    allocating, by the system, second inode numbers associated with internal files or internal directories on the filesystem, wherein the internal files are not visible to a user or a device associated with the user, wherein the internal directories are not visible to the user or the device associated with the user, and wherein the second inode numbers do not have to be preserved.

8. The method of claim 7, wherein the internal files or the internal directories comprise a system level file, a system level directory, an access control list file, a quota database file, an alternate data streams container, a hard-link database, a storage system configuration file, an executable for use in booting the filesystem, or a log file associated with the filesystem.

9. The method of claim 1, wherein the source filesystem is a first source filesystem, wherein the filesystem is a first destination filesystem, wherein the items of information are first items of information, and wherein the method further comprises:
    upon determining that the migrating of the items of information contained in the source slices of the first source filesystem to the first inode slices of the first destination filesystem is completed, preventing, by the system, allocation of other inode numbers to the second portion of inode slices of the second filesystem inode subspace region to enable the first destination filesystem to be a second source filesystem for migration of second items of information of the second source filesystem to a second destination filesystem.

10. The method of claim 1, wherein the first inode slices comprise lower numbered first inode slices and higher numbered first inode slices that are higher in number than the lower numbered first inode slices, and wherein, with regard to the first filesystem inode subspace region, the lower numbered first node slices correspond to lower numbered inodes, and the higher numbered first node slices correspond to higher numbered inodes that are higher in number than the lower numbered inodes.

11. The method of claim 1, further comprising:
    demarcating, by the system, the first filesystem inode subspace region and the second filesystem inode subspace region based at least in part on at least one slice that is maintained as unprovisioned and is located between the first portion of inode slices and the second portion of inode slices.

12. A system, comprising:
    at least one memory that stores computer executable components; and
    at least one processor that executes computer executable components stored in the at least one memory, wherein the computer executable components comprise:
        a partitioner component that partitions a filesystem inode subspace of a destination filesystem into a first filesystem inode subspace region comprising a first group of inode slices and a second filesystem inode subspace region comprising a second group of inode slices, wherein items of information comprise at least one of user files, directories, or inode numbers, and wherein the first group of inode slices is associated with lower inode slice numbers than higher inode slice numbers associated with the second group of inode slices; and
        a provisioner manager component that, during a migration of the items of information, provisions first inode slices of the first group of inode slices in a first order that is arranged or determined based at least in part on a third order of migration of the user files or the directories from a source filesystem to the destination filesystem, wherein the items of information of source slices of the source filesystem are migrated to the first inode slices of the destination filesystem, wherein the inode numbers are mapped to the user files or the directories, or a mapping of the inode numbers to the first inode slices,
        wherein, during or in connection with the migration of the items of information, the provisioner manager component provisions the second inode slices in a second order with a higher numbered second inode slice being provisioned before a next lower numbered second inode slice is provisioned, wherein the next lower numbered second inode slice is lower in number than and neighbors the higher numbered second inode slice, and wherein the second order is different from the first order.

13. The system of claim 12, wherein at least one unprovisioned slice delineates or separates the first filesystem inode subspace region from the second filesystem inode subspace region.

14. The system of claim 12, wherein a highest numbered second inode slice, or the higher numbered second inode slice that is lower in number than and within a defined number of slices of the highest numbered second inode slice, is a second inode slice, of the second inode slices, that is first to be provisioned in the second filesystem inode subspace region.

15. The system of claim 12, wherein the computer executable components further comprise an inode manager component,
    wherein, during or in connection with the migration of the items of information, the provisioner manager component provisions the higher numbered second inode slice, in accordance with the second order, wherein the inode manager component allocates a first group of inode numbers associated with the higher numbered second inode slice, wherein, in response to determining that the higher numbered second inode slice is full, the provisioner manager component provisions the next lower numbered second inode slice, in accordance with the second order, and wherein the inode manager component allocates a second group of inode numbers associated with the next lower numbered second inode slice.

16. The system of claim 12, wherein the items of information are first items of information, and wherein the computer executable components further comprise:

a migrator component that migrates the first items of information, comprising common-internet-file-system and network-file-system open file handles associated with the files and the directories, from the source slices of the source filesystem for storage in the first inode slices of the first group of inode slices of the destination filesystem, wherein the migrator component preserves the common-internet-file-system and the network-file-system open file handles, comprising the inode numbers associated with the files or the directories, during and subsequent to the migration of the first items of information for storage in the first inode slices of the first group of inode slices of the destination filesystem, and wherein the migrator component migrates second items of information, comprising or relating to the files or the directories, from the source slices of the source filesystem for storage in data slices or metadata slices of the destination filesystem.

17. The system of claim 16, wherein the inode numbers are first inode numbers, and wherein the computer executable components further comprise:

an inode manager component that generates or allocates second inode numbers associated with internal files or internal directories on the destination filesystem, wherein the internal files are not visible to a user or a device associated with the user, wherein the internal directories are not visible to the user or the device associated with the user, and wherein the second inode numbers do not have to be preserved.

18. The system of claim 12, wherein the source filesystem is a first source filesystem, wherein the destination filesystem is a first destination filesystem, wherein the items of information are first items of information, and wherein the computer executable components further comprise:

an inode manager component that, in response to determining that the migration of the first items of information contained in the source slices of the first source filesystem to the first inode slices of the first destination filesystem is completed, restricts allocation of other inode numbers from the second filesystem inode subspace region to enable the first destination filesystem to be a second source filesystem for migration of second items of information of the second source filesystem to a second destination filesystem.

19. A non-transitory machine-readable medium, comprising executable instructions that, when executed by at least one processor, facilitate performance of operations, comprising:

partitioning a group of inode slices of a target filesystem into a first subgroup of inode slices and a second subgroup of inode slices, wherein the first subgroup of inode slices is associated with lower inode slice numbers than higher inode slice numbers associated with the second subgroup of inode slices;

during a migration of files or directories to the target filesystem, provisioning first inode slices of the first subgroup of inode slices in a first order that is structured or determined based at least in part on a third order of migration of the files or the directories from a source filesystem to the target filesystem, wherein inode information items of inodes with inode numbers, which are associated with source slices of the source filesystem, are migrated to the first inode slices of the target filesystem, and wherein the inode numbers are associated with the files or the directories being migrated to the target filesystem, or a mapping of the inode numbers to the first inode slices; and during or in connection with the migration, provisioning second inode slices of the second subgroup of inode slices in a second order with a higher numbered second inode slice being provisioned prior to a next lower numbered second inode slice being provisioned, wherein the next lower numbered second inode slice is lower in number than and adjacent to the higher numbered second inode slice, and wherein the second order is distinct from the first order.

20. The non-transitory machine-readable medium of claim 19, wherein the inode information items are first inode information items, and wherein the operations further comprise:

initiating migrating of the first inode information items, comprising common-internet-file-system and network-file-system open file handles associated with the user files and the directories, from the source slices of the source filesystem for storage in the first inode slices of the first subgroup of inode slices of the target filesystem, wherein the common-internet-file-system and the network-file-system open file handles, comprising the inode numbers associated with the user files or the directories, are preserved during and subsequent to the migrating of the inode information items for storage in the first inode slices of the first subgroup of inode slices of the target filesystem; and initiating migrating of second inode information items, comprising or relating to the user files and the directories, from the source slices of the source filesystem for storage in data slices or metadata slices of the target filesystem, wherein the source filesystem is active during the migrating of the first inode information items and the migrating of the second inode information items.

* * * * *